(12) United States Patent
Lee et al.

(10) Patent No.: US 12,410,966 B2
(45) Date of Patent: Sep. 9, 2025

(54) PLATE ASSEMBLY AND HOME APPLIANCE

(71) Applicant: SAMSUNG ELECTRONICS CO., LTD., Suwon-si (KR)

(72) Inventors: Jaehyun Lee, Suwon-si (KR);
Jinyoung Song, Suwon-si (KR);
Byungkwan Yang, Suwon-si (KR);
Youngmin You, Suwon-si (KR);
Wonjae Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 18/367,910

(22) Filed: Sep. 13, 2023

(65) Prior Publication Data
US 2024/0200849 A1 Jun. 20, 2024

Related U.S. Application Data

(63) Continuation of application No. PCT/KR2023/013164, filed on Sep. 4, 2023.

(30) Foreign Application Priority Data

Dec. 14, 2022 (KR) .................. 10-2022-0175305

(51) Int. Cl.
*F25D 17/06* (2006.01)
(52) U.S. Cl.
CPC ......... *F25D 17/062* (2013.01); *F25D 17/067* (2013.01)
(58) Field of Classification Search
CPC ...... F25D 17/062; F25D 17/067; F25D 23/08; F25D 23/067; F25D 2323/06
See application file for complete search history.

(56) References Cited

U.S. PATENT DOCUMENTS

| 5,779,197 A | 7/1998 | Kim |
| 10,690,390 B2 | 6/2020 | Kim et al. |

(Continued)

FOREIGN PATENT DOCUMENTS

| CN | 216694137 U | 6/2022 |
| CN | 217483056 U | 9/2022 |

(Continued)

OTHER PUBLICATIONS

English language translation of JP2022070725 to Hayakawa. Translated Apr. 2025. (Year: 2022).*

(Continued)

*Primary Examiner* — Cassey D Bauer
(74) *Attorney, Agent, or Firm* — STAAS & HALSEY LLP

(57) ABSTRACT

A refrigerator including a storage compartment and a cold air duct to guide cold air to the storage compartment, the cold air duct including a front plate facing the storage compartment, the front plate including a front body with a first coupling portion, a rear plate detachably coupled to the front plate, the rear plate including a rear body with a second coupling portion, and a slit in the rear body so that the second coupling portion is elastically deformable, and a heat insulating member between the front plate and the rear plate. The first coupling portion is coupled to the second coupling portion. The first coupling portion and the second coupling portion are decouplable by an external force pressing on the first coupling portion.

15 Claims, 24 Drawing Sheets

(56) References Cited

U.S. PATENT DOCUMENTS

2015/0132078 A1     5/2015   Yamamoto
2023/0332819 A1    10/2023   Park et al.

FOREIGN PATENT DOCUMENTS

| | | | |
|---|---|---|---|
| EP | 4 047 292 B1 | 11/2023 | |
| JP | 10-135652 | 5/1998 | |
| JP | 11-28985 | 2/1999 | |
| JP | 2003-32862 | 1/2003 | |
| JP | 2008-51126 | 3/2008 | |
| JP | 5377954 | 12/2013 | |
| JP | 5648756 | 1/2015 | |
| JP | 5719485 | 5/2015 | |
| JP | 2022070725 A * | 5/2022 | ............. F25D 11/02 |
| JP | 2022-529441 | 6/2022 | |
| KR | 10-0333813 | 4/2002 | |
| KR | 10-1011634 | 1/2011 | |
| KR | 10-1844852 | 4/2018 | |
| KR | 10-1852677 | 4/2018 | |
| KR | 10-2022-0082388 | 6/2022 | |

OTHER PUBLICATIONS

International Search Report dated Dec. 13, 2023 International application No. PCT/KR2023/013164.
Written Opinion of the International Searching Authority dated Dec. 13, 2023 International application No. PCT/KR2023/013164.

\* cited by examiner

PLATE ASSEMBLY AND HOME APPLIANCE

CROSS-REFERENCE TO RELATED APPLICATIONS

This application is a continuation application, under 35 U.S.C. § 111(a), of International Application No. PCT/KR2023/013164, filed on Sep. 4, 2023, which claims priority under 35 U.S.C. § 119 to Korean Patent Application No. 10-2022-0175305, filed on Dec. 14, 2022, in the Korean Intellectual Property Office, the disclosures of which are incorporated by reference herein in their entireties.

BACKGROUND

1. Field

The disclosure relates to an improved plate assembly and a home appliance including the same.

2. Description of the Related Art

A refrigerator is an appliance that stores food in a fresh state by including a main body having a storage compartment and a cold air supply system configured to supply cold air to the storage compartment. The storage compartment includes a refrigerating compartment maintained at a temperature of about 0 to 5° C. to refrigerate and store food and a freezing compartment maintained at a temperature of about −30 to 0° C. to freeze and store food. Generally, the storage compartment is provided to have an open front surface to allow food to be put in and taken out, and the open front surface of the storage compartment is opened and closed by a door.

The refrigerator repeats a cooling cycle in which a refrigerant is compressed, condensed, expanded, and evaporated using a compressor, a condenser, an expander, and an evaporator. Here, both the freezing compartment and the refrigerator compartment may be cooled by a single evaporator provided at the freezing compartment side, or an evaporator may be provided in each of the freezing compartment and the refrigerator compartment for the freezing compartment and the refrigerator compartment to be independently cooled.

Types of refrigerators may be classified according to the forms of the storage compartment and the door. For example, refrigerators may be classified into top mounted freezer (TMF) refrigerators in which a storage compartment is vertically divided by a horizontal partition and a freezing compartment is formed at an upper side and a refrigerator compartment is formed at a lower side, and bottom mounted freezer (BMF) refrigerators in which the refrigerator compartment is formed at the upper side and the freezing compartment is formed at the lower side.

SUMMARY

Aspects of embodiments of the disclosure will be set forth in part in the description which follows and, in part, will be apparent from the description, or may be learned by practice of the presented embodiments.

According to an embodiment of the disclosure, a refrigerator includes a storage compartment: an evaporator configured to generate cold air; and a cold air duct configured to guide the cold air generated in the evaporator to the storage compartment, the cold air duct including a front plate facing the storage compartment, the front plate including a front body, and a first coupling portion on a rear surface of the front body, a rear plate detachably coupled to a rear of the front plate, the rear plate including a rear body, a second coupling portion including an opening in the rear body, and a locking portion, and a slit in the rear body configured so that the second coupling portion is elastically deformable, and a heat insulating member disposed between the front plate and the rear plate. The first coupling portion is coupled to the second coupling portion as a portion of the first coupling portion is inserted into the opening in the rear body, and the locking portion protrudes toward and contacts the portion of the first coupling portion inserted into the opening in the rear body. The first coupling portion and the second coupling portion are configured so that the first coupling portion and the second coupling portion are decouplable by an external force pressing on the first coupling portion.

According to an embodiment of the disclosure, the first coupling portion may include a first coupling protrusion extending in a first direction directed toward the rear plate, a second coupling protrusion spaced apart from the first coupling protrusion and extending in the first direction, and a bridge connecting the first coupling protrusion and the second coupling protrusion, the bridge including a recessed portion recessed in a second direction opposite to the first direction.

According to an embodiment of the disclosure, in response to the external force pressing on the recessed portion of the bridge in the second direction in a state in which the front plate and the rear plate are coupled to each other, the first coupling protrusion and the second coupling protrusion are moved toward one another so that the first coupling portion and the second coupling portion are decoupled.

According to an embodiment of the disclosure, in response to the external force pressing the first coupling protrusion and the second coupling protrusion to be moved toward one another in a state in which the front plate and the rear plate are coupled to each other, the bridge is elastically deformed and the first coupling portion and the second coupling portion are decoupled.

According to an embodiment of the disclosure, the refrigerator may further include a cap corresponding to the opening and detachably mounted on the opening to prevent moisture from entering the opening.

According to an embodiment of the disclosure, the rear plate may include a cover configured to open and close the opening to prevent moisture from entering the opening.

According to an embodiment of the disclosure, the slit may extend along a first direction in which the first coupling protrusion and the second coupling protrusion are arranged.

According to an embodiment of the disclosure, the slit may include a first slit portion, and a second slit portion spaced apart from the first slit portion. The first coupling portion may be disposed between the first slit portion and the second slit portion in a state in which the front plate and the rear plate are coupled to each other.

According to an embodiment of the disclosure, the second coupling portion may include a coupling body configured to surround the portion of the first coupling portion inserted into the opening in the rear body. The slit may include a first slit forming portion along a portion of an edge of the coupling body, a second slit forming portion extending in a straight line from a first side of the first slit forming portion, and a third slit forming portion extending in a straight line from a second side of the first slit forming portion.

According to an embodiment of the disclosure, the slit may include a first slit forming portion spaced apart from the opening and extending in a direction perpendicular to a direction in which the first coupling protrusion and the second coupling protrusion are arranged, a second slit forming portion extending from a first side of the first slit forming portion toward the opening along the direction in which the first coupling protrusion and the second coupling protrusion are arranged, and a third slit forming portion extending from a second side of the first slit forming portion toward the opening along the direction in which the first coupling protrusion and the second coupling protrusion are arranged.

According to an embodiment of the disclosure, the first coupling portion may include a first groove on the first coupling protrusion, and accessible through the opening from behind the rear body, and a second groove on the second coupling protrusion, and accessible through the opening from behind the rear body.

According to an embodiment of the disclosure, the bridge may include a first bridge portion extending from the first coupling protrusion to the recessed portion, and sloping toward the front body, and a second bridge portion extending from the second coupling protrusion to the recessed portion, and sloping toward the front body.

According to an embodiment of the disclosure, the recessed portion may be provided at a center of the bridge.

According to an embodiment of the disclosure, the heat insulating member may be configured to be in surface contact with at least one of the front plate and the rear plate.

According to an embodiment of the disclosure, the heat insulating member may include a support hole corresponding to the opening of the second coupling portion and configured to accommodate the first coupling portion, and a seating portion extending inwardly from a rear surface of the heat insulating member about the support hole, and configured to support the locking portion of the second coupling portion.

BRIEF DESCRIPTION OF THE DRAWINGS

These and/or other embodiments of the disclosure will become apparent and more readily appreciated from the following description of embodiments, taken in conjunction with the accompanying drawings of which.

DETAILED DESCRIPTION

Figure 1:
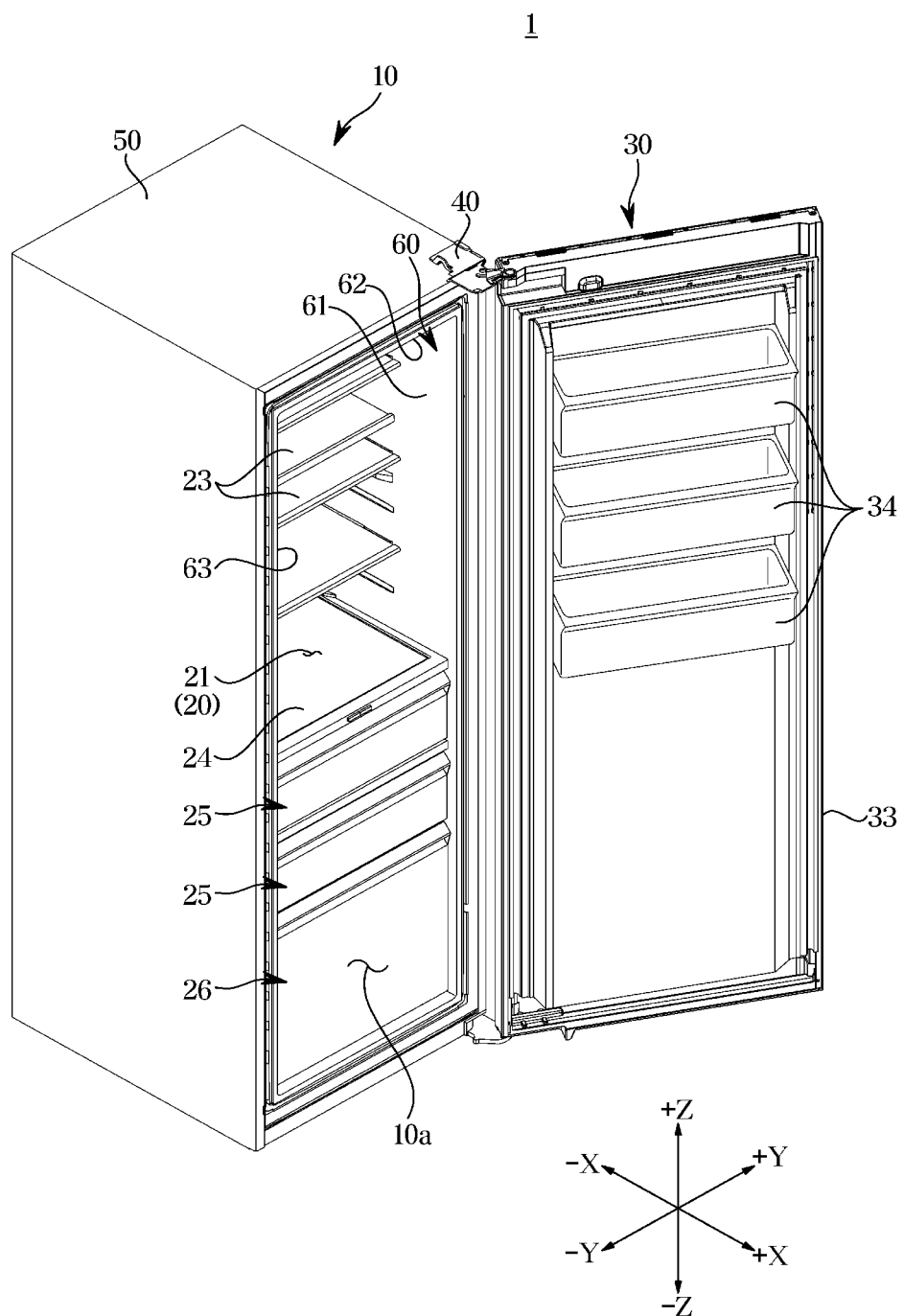
FIG. 1 is a perspective view illustrating an example of a refrigerator according to an embodiment of the disclosure.

The various embodiments of the disclosure and terminology used herein are not intended to limit the technical features of the disclosure to the specific embodiments, but rather should be understood to cover all modifications, equivalents, and alternatives falling within the concept and scope of the disclosure.

In the description of the drawings, like numbers refer to like elements throughout the description of the drawings.

The singular forms preceded by "a," "an," and "the" corresponding to an item are intended to include the plural forms as well unless the context clearly indicates otherwise.

In the disclosure, a phrase such as "A or B," "at least one of A and B," "at least one of A or B," "A, B or C," "at least one of A, B and C," and "at least one of A, B, or C" may include any one of the items listed together in the corresponding phrase of the phrases, or any possible combination thereof.

The term "and/or" includes combinations of one or all of a plurality of associated listed items.

As used herein, such terms as "1st" and "2nd," or "first" and "second" may be used to simply distinguish a corresponding component from another, and does not limit the components in other aspect (for example, importance or order).

When one (e.g., a first) element is referred to as being "coupled" or "connected" to another (e.g., a second) element with or without the term "functionally" or "communicatively," it means that the one element is connected to the other element directly, wirelessly, or via a third element.

It will be understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It is to be understood that if a certain component is referred to as being "coupled to," "coupled to," "supported on" or "in contact with" another component, it means that the component may be coupled to the other component directly or indirectly via a third component.

Throughout the specification, when a member is referred to as being "on" another member, the member is in contact with another member or yet another member is interposed between the two members.

On the other hand, in this specification, the terms "front-rear direction," "front," "rear," "upper-lower direction," "height direction," "upper side," "lower side," "left-right direction," "left side," "right side," and the like are defined based on the drawings, but the terms may not restrict the shape and position of the respective components.

Embodiments of the disclosure may provide a plate assembly and a home appliance with an improved structure.

Embodiments of the disclosure may provide a plate assembly and a home appliance capable of facilitating coupling and/or disassembling between parts.

Embodiments of the disclosure may provide a plate assembly and a home appliance capable of one-touch assembly and/or one-touch disassembly.

Embodiments of the disclosure may provide a plate assembly and a home appliance capable of preventing moisture from entering a coupling region between parts.

Embodiments of the disclosure may provide a plate assembly and a home appliance capable of preventing a portion exposed to the outside from being sunk.

Embodiments of the disclosure may provide a plate assembly and a home appliance with an improved sealing property.

Embodiments of the disclosure are not limited to the various aspects mentioned above, and other aspects may become apparent to those of ordinary skill in the art based on the following descriptions.

Hereinafter, embodiments according to the disclosure will be described in detail with reference to the accompanying drawings.

Figure 2:
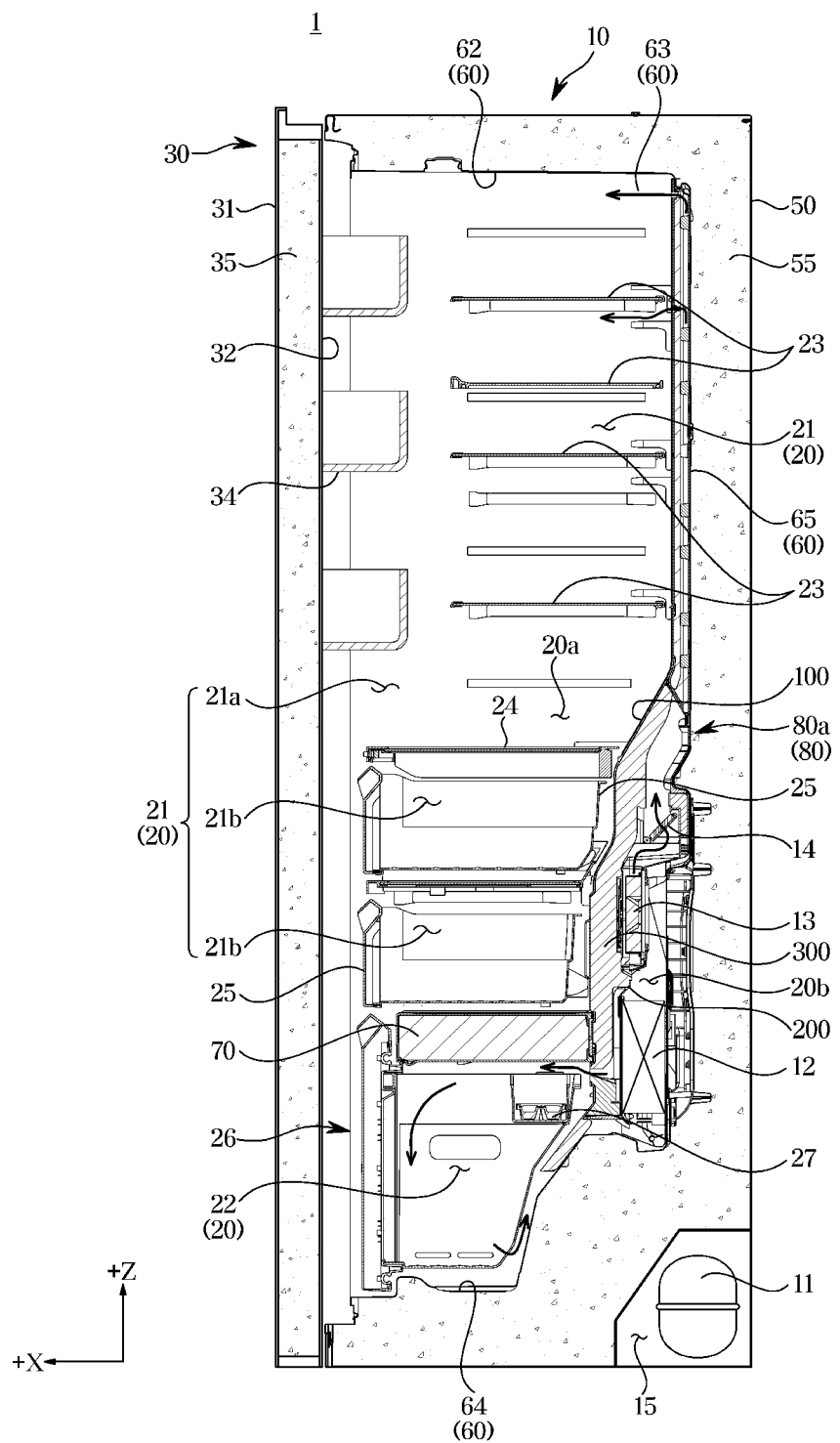
FIG. 2 is a cross-sectional side view illustrating an example of a refrigerator according to an embodiment of the disclosure.

FIG. 1 is a perspective view illustrating an example of a refrigerator according to an embodiment. FIG. 2 is a cross-sectional side view illustrating an example of a refrigerator according to an embodiment.

Referring to FIGS. 1 and 2, a refrigerator 1 will be described as an example of a home appliance including a plate assembly 80a. However, home appliances according to the disclosure are not limited to the refrigerator 1. For example, the plate assembly 80a may be applied to various home appliances, such as a washing machine, a clothes care device, a shoe care device, an air conditioner, an air purifier, a humidifier, a cooking appliance, a dishwasher, a television (TV), and the like.

Referring to FIGS. 1 and 2, a refrigerator 1 may include a main body 10. The refrigerator 1 may include a storage compartment 20 provided inside the main body 10. The refrigerator 1 may include, a door 30 configured to open and close the storage compartment 20. The refrigerator 1 may include a cooling system configured to supply cold air to the storage compartment 20.

The main body 10 may form at least a part of the external appearance of the refrigerator 1. The main body 10 may have a front side that is open to allow a user to put food in the storage compartment 20 or take food out of the storage compartment 20. The main body 10 may include an opening 10a. The opening 10a of the main body 10 may be opened and closed by the door 30.

The door 30 may be provided to open and close the main body 10. The door 30 may be configured to open and close the opening 10a of the main body 10. The door 30 may be rotatably coupled to the main body 10. For example, the door 30 may be rotatably coupled to the main body 10 by a hinge 40 connected to each of the door 30 and the main body 10.

An outer surface 31 of the door 30 may form a portion of the external appearance of the refrigerator 1. While the door 30 is in a closed position, the outer surface 31 of the door 30 may form a front surface of the door 30.

An inner surface 32 of the door 30 may be formed at a side opposite to the outer surface 31 of the door 30. While the door 30 is in the closed position, the inner surface 32 of the door 30 may form a rear surface of the door 30. While the door 30 is in the closed position, the inner surface 32 of the door 30 may be provided to face the inside of the main body 10. While the door 30 is in the closed position, the inner surface 32 of the door 30 may be provided to cover the front of the storage compartment 20.

The door 30 may include a door insulator 35. The door insulator 35 may be provided between the outer surface 31 of the door 30 and the inner surface 32 of the door 30. For example, a foaming space may be formed between the outer surface 31 of the door 30 and the inner surface 32 of the door 30, and the door insulator 35 may be foamed in the foaming space. The door insulator 35 may prevent a heat exchange from occurring between the outer surface 31 of the door 30 and the inner surface 32 of the door 30. The door insulator 35 may improve insulation performance between the inside of the storage compartment 20 and the outside of the door 30.

Urethane foam insulation, expanded polystyrene insulation (EPS), a vacuum insulation panel, and the like may be used for the door insulator 35. However, the disclosure is not limited thereto, and the door insulator 35 may include various other materials to improve insulation performance between the storage compartment 20 and the door 30.

For example, the door insulator 35 may be configured with an insulator formed of the same material as a main body insulator 55 to be descried below. On the other hand, for example, the door insulator 35 may be configured with an insulator formed of a different material from the main body insulator 55.

The door 30 may include a door gasket 33. The door gasket 33 may be provided on the inner surface 32 of the door 30. The door gasket 33 may seal a gap between the door 30 and the main body 10 to prevent leakage of cold air from the storage compartment 20. The door gasket 33 may be provided along the periphery of the inner surface 32 of the door 30. The door gasket 33 may be disposed to be parallel to the opening 10a of the main body 10 while the door 30 is closed. The door gasket 33 may be configured to include an elastic material such as rubber. However, it is not limited thereto, and the door gasket 33 may include various materials to seal between the door 30 and the main body 10.

The door 30 may include a door basket 34 for storing food. The door basket 34 may be provided on the inner surface 32 of the door 30.

The door 30 may be provided to open and close the inner space of the main body 10 as a whole. The door 30 may be provided to open and close the storage compartment 20 provided inside the main body 10. The door 30 may be provided to open and close a first storage compartment 21 and a second storage compartment 22, which will be described below. That is the first storage compartment 21 and the second storage compartment 22 may be opened and closed by a single door 30 without a need to provide a door for opening and closing the first storage compartment 21 and a door for opening and closing the second storage compartment 22.

For example, the door 30 may close the first storage compartment 21 to be described below, while the opening 10a of the main body 10 is closed. The door 30 may cover the front of the first storage compartment 21 while the opening 10a of the main body 10 is closed.

For example, the door 30 may close the second storage compartment 22 to be described below while the opening 10a of the main body 10 is closed. The door 30 may cover the front of the second storage compartment 22 while the opening 10a of the main body 10 is closed.

For example, the door 30 may cover the front of a first drawer 25 to be described below while the opening 10a of the main body 10 is closed. In a state in which the first drawer 25 is inserted into a first lower storage compartment 21b, the front of the first drawer 25 may be covered by the door 30. However, it is not limited thereto, and the door 30 may directly close the first lower storage compartment 21b.

For example, the door 30 may cover the front of a second drawer 26 to be described below while the opening 10a of the main body 10 is closed. In a state in which the second drawer 26 is inserted into the second storage compartment 22, the front of the second drawer 26 may be covered by the door 30. However, it is not limited thereto, and the door 30 may directly close the second storage compartment 22.

For example, the door 30 may cover the front of a first shelf 23 while the opening 10a of the main body 10 is closed. The entirety of the first shelf 23 may be disposed inside the main body 10, and thus in a state in which the opening 10a of the main body 10 is closed, the first shelf 23 may be covered by the door 30 without being visible from the outside.

For example, the door 30 may cover the front of a second shelf 24 while the opening 10a of the main body 10 is closed. The entirety of the second shelf 24 may be disposed inside the main body 10, and thus in a state in which the opening 10a of the main body 10 is closed, the second shelf 24 may be covered by the door 30 without being visible from the outside.

The main body 10 may include an outer case 50. The outer case 50 may form at least a part of the external appearance of the refrigerator 1. The outer case 50 may be provided on the outside of the inner case 60. The outer case 50 may be formed to have a substantially box-like shape having an open front surface. For example, the outer case 50 may form upper and, lower surfaces, left, and right surfaces, and a rear surface of the refrigerator 1.

The outer case 50 may include a metal material. For example, the outer case 50 may be manufactured by processing a steel plate material.

The main body 10 may include the inner case 60. The inner case 60 may be provided on the inside of the outer case 50. The inner case 60 may form the storage compartment 20. The inner space of the inner case 60 may be provided as a storage compartment 20. The inner case 60 may have a shape with an open front. The inner case 60 may be formed to have a substantially box-like shape having an open front surface.

The inner case 60 may include inner walls 61, 62, 63, 64, and 65.

For example, the inner case 60 may include a right wall 61, an upper wall 62, a left wall 63, a bottom wall 64, and a rear wall 65. For example, the right wall 61, the upper wall 62, the left wall 63, the bottom wall 64, and the rear wall 65 of the inner case 60 may form the storage compartment 20.

The inner case 60 may include a plastic material. For example, the inner case 60 may be manufactured by a vacuum forming process. For example, the inner case 60 may be manufactured by an injection molding process.

The main body 10 may include the main body insulator 55. The main body insulator 55 may be provided between the outer case 10 and the inner case 60. The main body insulator 55 may be provided to insulate the outer case 50 and the inner case 60 from each other. As the main body insulator 55 is foamed between the outer case 50 and the inner case 60, the outer case 50 and the inner case 60 may be coupled to each other. The main body insulator 55 may prevent heat exchange between the inside of the storage compartment 20 and the outside of the main body 10, thereby improving the cooling efficiency of the storage compartment 20.

Urethane foam insulation, expanded polystyrene insulation (EPS), a vacuum insulation panel, and the like may be used for the main body insulator 55. However, the disclosure is not limited thereto, and the main body insulator 55 may be configured to include various other materials.

The main body 10 may include the storage compartment 20. The storage compartment 20 may be formed by the inner case 60. The storage compartment 20 may be provided as one space inside the inner case 60. The storage compartment 20 may be provided as a single unit. For example, the inner case 60 may have a shape of a box with an open front, and include the storage compartment 20 formed therein.

The storage compartment 20 may be divided into a plurality of spaces by a partition 70. For example, the storage compartment 20 may be divided into the first storage compartment 21 and the second storage compartment 22 by the partition 70.

The main body 10 may include the first storage compartment 21 and the second storage compartment 22. The first storage compartment 21 may be provided above the second storage compartment 22. The first storage compartment 21 may be disposed upward (+Z direction) of the second storage compartment 22. The second storage compartment 22 may be provided below the first storage compartment 21. The second storage compartment 22 may be disposed downward (−Z direction) of the first storage compartment 21.

The first storage compartment 21 and the second storage compartment 22 may have different temperatures. However, it is not limited thereto, and the first storage compartment 21 and the second storage compartment 22 may be provided to have the same temperature as needed.

For example, the first storage compartment 21 may include a first upper storage compartment 21a and the first lower storage compartment 21b. The first upper storage compartment 21a may be provided above the first lower storage compartment 21b. The first upper storage compartment 21a may be disposed upward (+Z direction) of the first lower storage compartment 21b. The first lower storage compartment 21b may be provided below the first upper storage compartment 21a. The first lower storage compartment 21b may be disposed downward (−Z direction) of the first upper storage compartment 21a.

For example, the first shelf 23 on which food may be placed, a storage container (not shown) in which food may be stored, and the like may be provided in the first upper storage compartment 21a. The first shelf 23 may be provided in at least one unit thereof. The storage container may be provided in at least one unit thereof.

For example, the first drawer 25 may be provided in the first lower storage compartment 21b. The first drawer 25 may be provided to be withdrawn from and inserted into the first lower storage compartment 21b through the opening 10a of the main body 10. The first drawer 25 may be provided to be withdrawn and inserted in the front-rear direction (X direction). For example, the second shelf 24 may be provided upward (+Z direction) of the first drawer 25. Food may be placed on the second shelf 24. For example, the first lower storage compartment 21b may be defined by the first drawer 25 and the second shelf 24.

Unlike the first upper storage compartment 21a, the first lower storage compartment 21b may be prevented from contacting external air even when the door 30 is opened with respect to the main body 10. Thus, the first lower storage compartment 21b may be a space for food that needs to be stored for a relatively long time compared to the first upper storage compartment 21a.

For example, the second drawer 26 may be provided in the second storage compartment 22. The second drawer 26 may be provided to be withdrawn from or inserted into the second storage compartment 22 through the opening 10a of the main body 10. The second drawer 26 may be provided to be withdrawn and inserted in the front and rear direction (X direction). For example, the partition 70 may be provided upward (+Z direction) of the second drawer 26. For example, the second storage compartment 22 may be defined by the second drawer 26 and the partition 70. However, the size of the second storage compartment 22 may vary depending on the location of the partition 70.

Meanwhile, the first storage compartment 21 may be provided as a refrigerating compartment 21, and the second storage compartment 22 may be provided as a freezing compartment 22. In this case, an ice maker 27 may be disposed inside the second storage compartment 22. However, this is merely exemplary, and the first storage compartment 21 may be provided as a freezing compartment, and the second storage compartment 22 may be provided as a refrigerating compartment. In this case, the ice maker 27 may be disposed inside the first storage compartment 21.

Hereinafter, for convenience of description, a case in which the first storage compartment 21 is provided as a refrigerating compartment 21 and the second storage compartment 22 is provided as a freezing compartment 22 will be described as an example.

The refrigerating compartment 21 may be provided to keep food refrigerated. The refrigerating compartment 21 may be maintained at an appropriate temperature for refrigerated storage.

The freezing compartment 22 may be provided to keep food frozen. The freezing compartment 22 may be maintained at an appropriate temperature for frozen storage.

The refrigerator 1 may include the partition 70. The partition 70 may be disposed in the storage compartment 20. The partition 70 may divide the storage compartment 20 into a plurality of spaces. The partition 70 may divide the storage compartment 20 into the refrigerating compartment 21 and the freezing compartment 22.

The partition 70 may be disposed in front of a cold air duct 80. The partition 70 may be detachably mounted on the cold air duct 80. For example, the partition 70 may be detachably coupled to the front surface of the cold air duct 80.

The refrigerator 1 may include a cooling system provided to generate cold air using a cooling cycle and supply the generated cold air to the storage compartment 20. The cooling system may generate cold air using latent heat of evaporation of the refrigerant in a cooling cycle.

For example, the refrigerator 1 may include a compressor 11. The refrigerator 1 may include a condenser (not shown). The refrigerator 1 may include an expansion valve (not shown). The refrigerator 1 may include an evaporator 12. The refrigerator 1 may include a fan 13.

A cooling room 20b may be provided in the main body 10. The evaporator 12, the fan 13, and the like may be provided in the cooling room 20b. The cooling room 20b may be referred to as a cold air forming space 20b.

A machine room 15 may be provided in the main body 10. The compressor 11 and the condenser may be provided in the machine room 15.

Parts of the refrigerator 1 constituting the cooling system may have a relatively great weight. Accordingly, the cooling room 20b and the machine room 15 may be provided in a lower portion of the main body 10. However, it is not limited thereto, and the cooling room 20b and the machine room 15 may be arranged in various forms, and the components constituting the cooling system may be arranged in various forms to correspond to the positions of the cooling room 20b and the machine room 15.

Since cold air is generated by the evaporator 12 in the cooling room 20b, the cooling room 20b may be maintained at a relatively low temperature. Alternatively, since heat is generated by the compressor 11 and the condenser in the machine room 15, the machine room 15 may be maintained at a relatively high temperature. Accordingly, the cooling room 20b and the machine room 15 may be formed in respective spaces separated from each other to be thermally insulated. For example, the main body insulator 55 may be foamed between the cooling room 20b and the machine room 15.

The evaporator 12 provided in the cooling room 20b may generate cold air by evaporating a refrigerant, and the cold air generated by the evaporator 12 may be caused to flow through the fan 13. Cold air caused to flow by the fan 13 may be supplied to the storage compartment 20. The evaporator 12 may generate cold air in the cooling room 20b, and the cold air generated by the evaporator 12 may be caused to flow from the cooling room 20b to the storage compartment 20 by the fan 13.

The refrigerator 1 may be an indirect cooling refrigerator. For convenience of description, the refrigerator 1 according to an embodiment of the disclosure is described on the assumption that the refrigerator 1 is an indirect cooling refrigerator, but the concept of the disclosure is not limited thereto and may be applied to a direct cooling refrigerator.

The evaporator 12, the fan 13, and the like disposed in the cooling room 20b may be referred to as a cold air supply device as generating cold air and causing the cold air to flow such that the storage compartment 20 is supplied with the cold air.

The refrigerator 1 may include a damper 14. The damper 14 may be accommodated inside the cold air duct 80. The damper 14 may be provided to open and close a passage formed inside the cold air duct 80. The damper 14 may be provided to adjust the opening degree of the passage formed inside the cold air duct 80.

The refrigerator 1 may include the cold air duct 80. The cold air duct 80 may form a passage through which cold air may flow. The cold air duct 80 may be provided to collect cold air inside the storage compartment 20 and guide the cold air to the evaporator 12. The cold air duct 80 may be provided to guide cold air generated by the evaporator 12 into the storage compartment 20. The cold air duct 80 may be provided to supply cold air generated by the evaporator 12 to the refrigerating compartment 21 and the freezing compartment 22.

The refrigerator 1 may include the plate assembly 80a. For example, the cold air duct 80 of the refrigerator 1 may include the plate assembly 80a. However, this is merely exemplary, and the plate assembly 80a may be applied for coupling various parts. For example, the main body 10 of the refrigerator 1 may include the plate assembly 80a. For example, the door 30 of the refrigerator 1 may include the plate assembly 80a. In addition, as described above, the plate assembly 80a may be applied to various home appliances other than the refrigerator 1.

For example, the plate assembly 80a may form at least a part of the cold air duct 80. For example, the plate assembly 80a may form a passage that allows cold air to flow therein.

Figure 3:
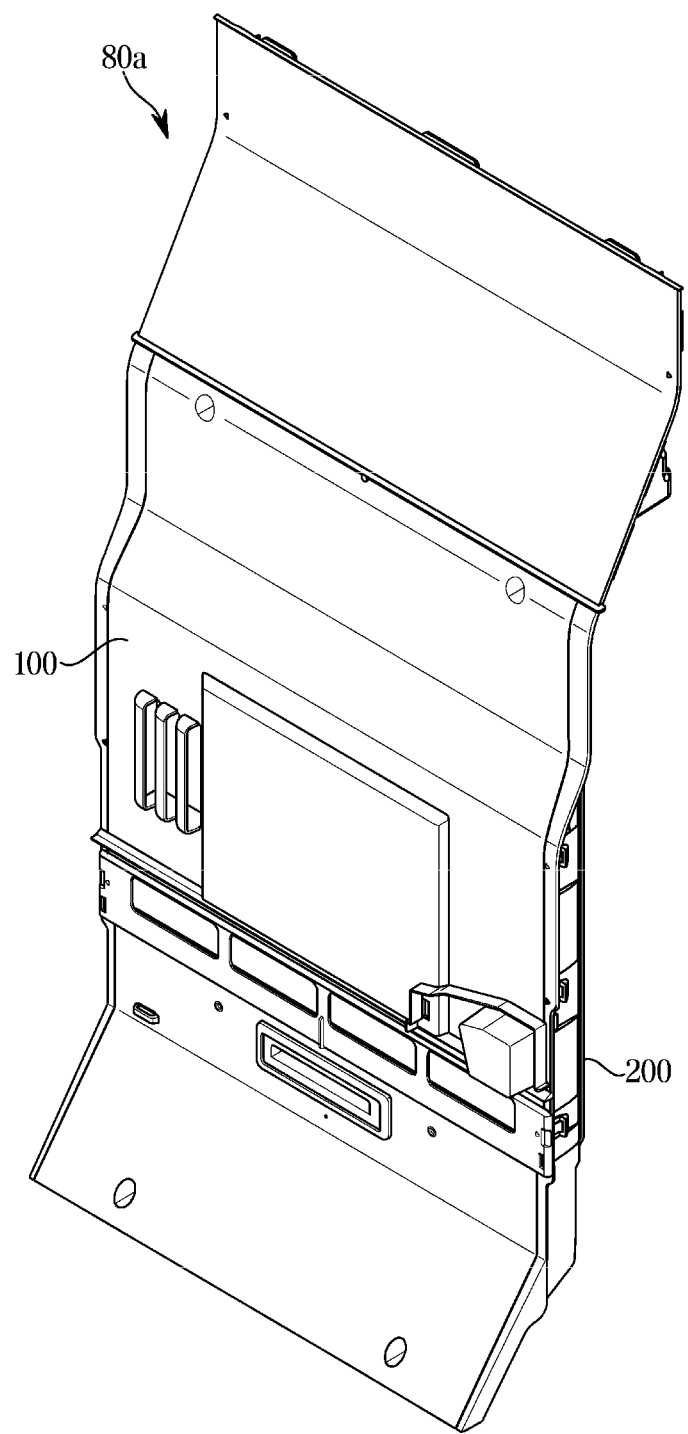
FIG. 3 is a perspective view illustrating an example of a plate assembly according to an embodiment of the disclosure.
Figure 4:
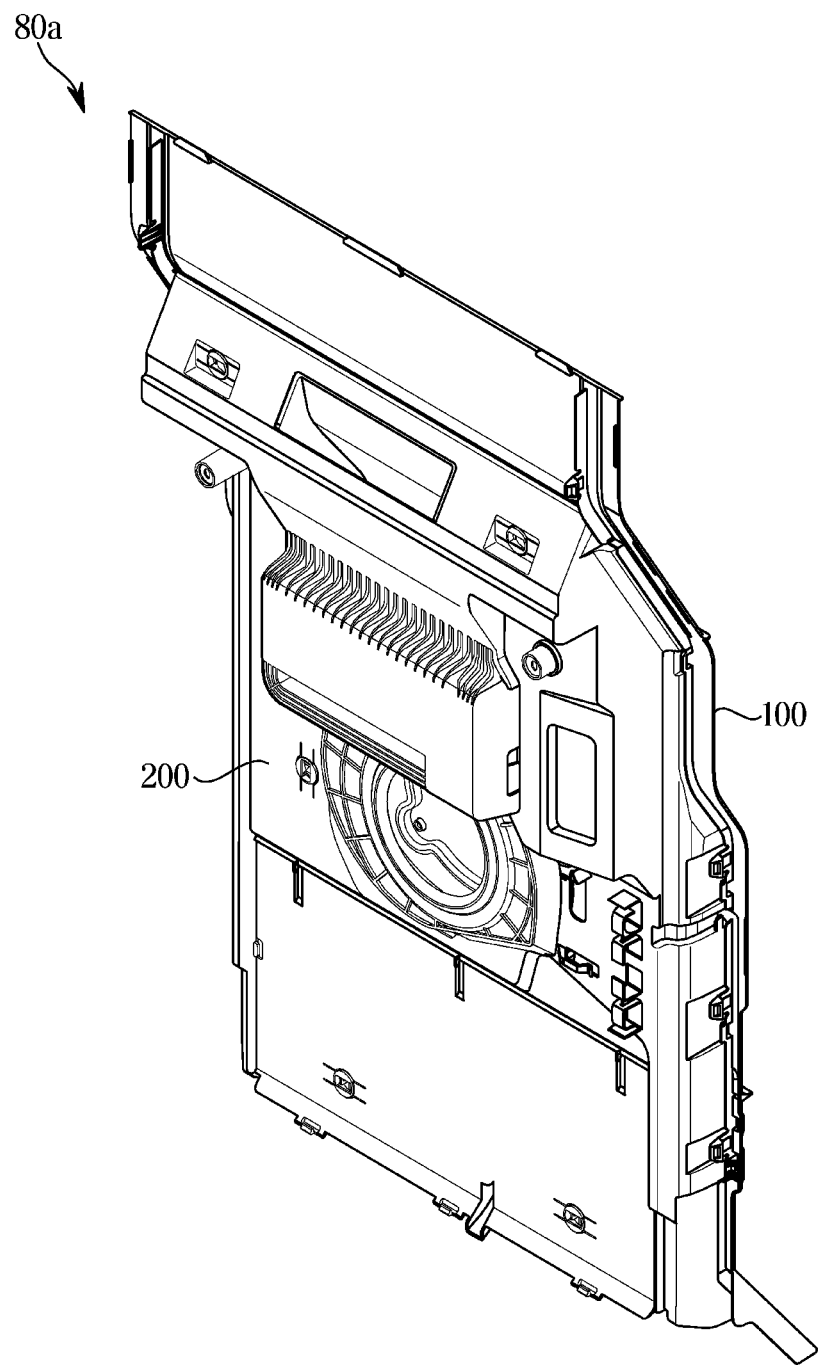
FIG. 4 is a perspective view illustrating the plate assembly shown in FIG. 3 when viewed from the rear.
Figure 5:
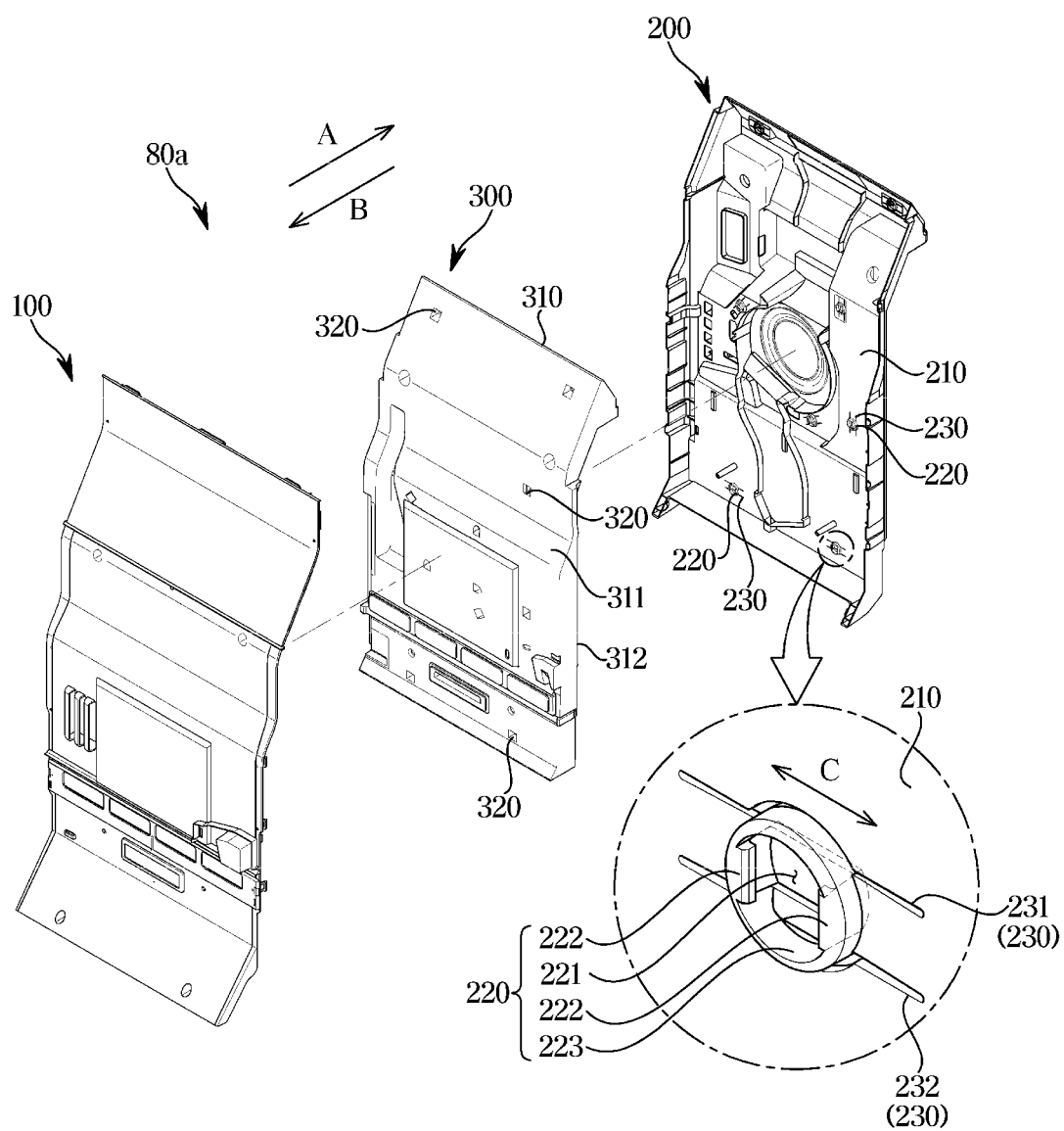
FIG. 5 is an exploded perspective view illustrating the plate assembly shown in FIG. 3.
Figure 6:
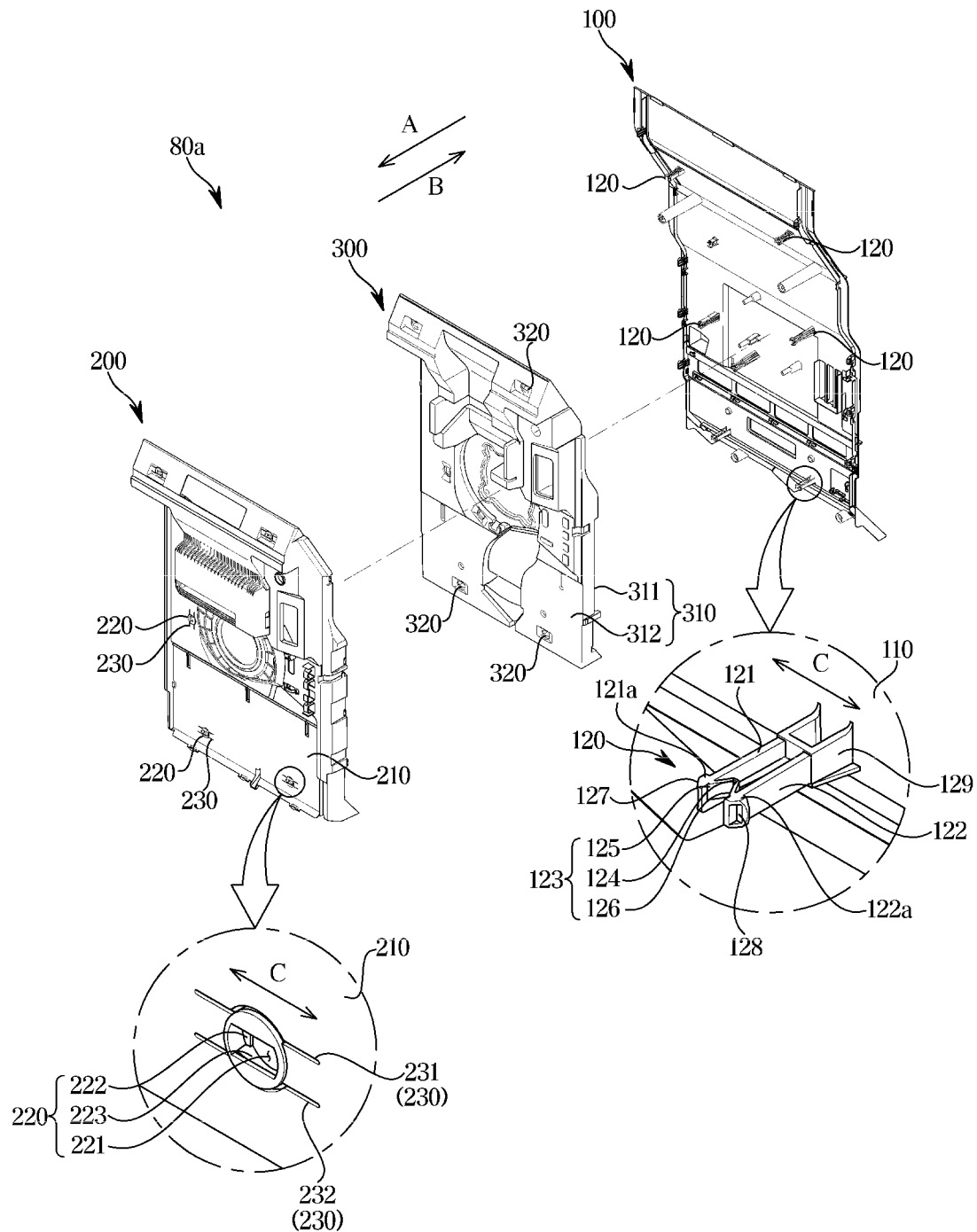
FIG. 6 is an exploded perspective view illustrating the plate assembly shown in FIG. 5 from the rear.

FIG. 3 is a perspective view illustrating an example of a plate assembly according to one embodiment. FIG. 4 is a perspective view illustrating the plate assembly shown in FIG. 3 when viewed from the rear. FIG. 5 is an exploded perspective view illustrating the plate assembly shown in FIG. 3. FIG. 6 is an exploded perspective view illustrating the plate assembly shown in FIG. 5 from the rear.

The plate assembly 80a may include a first plate 100. The plate assembly 80a may include a second plate 200.

The first plate 100 and the second plate 200 may be provided to face each other. The first plate 100 and the second plate 200 may be provided opposed to each other in the front-back direction (X direction).

The first plate 100 may be coupled to the front of the second plate 200. The first plate 100 may be detachably coupled to the front of the second plate 200.

For example, the first plate 100 may be exposed to the outside of the home appliance. For example, the first plate 100 may be exposed toward the storage compartment 20. For example, the first plate 100 may be provided to form a front external appearance of the plate assembly 80a. The first plate 100 may be referred to as a front plate 100.

The first plate 100 may include a first body 110. The first body 110 may form the external appearance of the first plate 100. The first body 110 may be referred to as a front body 110.

The first plate 100 may include a first coupling portion 120 for coupling with the second plate 200. The first coupling portion 120 may be formed on a side of the first body 110 facing the second plate 200. The first coupling portion 120 may be formed on a surface of the first body 110 facing the second plate 200. For example, when a support member 300 to be described below is disposed between the first plate 100 and the second plate 200, the first coupling portion 120 may be formed on one surface facing the support member 300 of the first body 110. For example, the one surface of the first body 110 facing the support member 300 may be an inner surface of the first body 110. For example, a surface provided on a side opposite to the inner surface of the first body 110 may be an outer surface. The first coupling portion 120 of the first plate 100 may be provided to correspond to a second coupling portion 220 of the second plate 200 to be described below. The first coupling portion 120 may be provided to be coupled to the second coupling portion 220. The first coupling portion 120 may be detachably coupled to the second coupling portion 220.

The first coupling portion 120 may include a protruding portion protruding from the first body 110 in the first direction A. The protruding portion may be inserted into an opening 221 of the second coupling portion 220 to be described below. The protruding portion may be locked with a locking portion 222 of the second coupling portion 220 to be described below.

The protruding portion of the first coupling portion 120 may include a first coupling protrusion 121 extending in a first direction A toward the second plate 200 from the first body 110. The first coupling protrusion 121 may be inserted into the opening 221 of the second coupling portion 220. The first coupling protrusion 121 may be locked to the locking portion 222 of the second coupling portion 220.

For example, the first coupling protrusion 121 may include a first ridge 121a configured to be locked with the locking portion 222 of the second coupling portion 220. For example, the first ridge 121a may be formed at the end of the first coupling protrusion 121.

The protruding portion of the first coupling portion 120 may include a second coupling protrusion 122 spaced apart from the first coupling protrusion 121. The second coupling protrusion 122 may extend in the first direction A toward the second plate 200 from the first body 110. The second coupling protrusion 122 may be inserted into the opening 221 of the second coupling portion 220. The second coupling protrusion 122 may be locked with the locking portion 222 of the second coupling portion 220.

For example, the second coupling protrusion 122 may include a second ridge 122a configured to be locked with by the locking portion 222 of the second coupling portion 220. For example, the second ridge 122a may be formed at the end of the second coupling protrusion 122.

For example, the first coupling protrusion 121 and the second coupling protrusion 122 may be provided as a pair.

For example, the first plate 100 may include a base portion 129 formed on a side of the first body 110 facing the second plate 200. For example, the first coupling protrusion 121 and the second coupling protrusion 122 may protrude from the base portion 129.

The first plate 100 may include at least one groove 127 or 128. A worker's hand or tool T may be inserted into the at least one groove 127 or 128.

For example, the first plate 100 may include a first groove 127 formed on the first coupling protrusion 121. For example, the first groove 127 may be formed at the end of the first coupling protrusion 121.

For example, the first plate 100 may include a second groove 128 formed on the second coupling protrusion 122. For example, the second groove 128 may be formed at the end of the second coupling protrusion 122.

The first coupling portion 120 may include a bridge 123. The bridge 123 may connect the first coupling protrusion 121 and the second coupling protrusion 122. The bridge 123 may include a recessed portion 124 recessed in a second direction B opposite to the first direction A. For example, the recessed portion 124 may be formed at the center of the bridge 123. For example, the bridge 123 may have a substantially V shape.

For example, the bridge 123 may include a first bridge portion 125 extending from the first coupling protrusion 121 to the recessed portion 124. The first bridge portion 125 may have a downwardly sloping shape toward the recessed portion 124.

For example, the bridge 123 may include a second bridge portion 126 extending from the second coupling protrusion 121 to the recessed portion 124. The second bridge portion 126 may have a downwardly sloping shape toward the recessed portion 124.

The first coupling portion 120 of the first plate 100 may be provided to be elastically deformable. For example, the protruding portion may be provided to be elastically deformable. For example, the first coupling protrusion 121 may be provided to be elastically deformable. For example, the second coupling protrusion 122 may be provided to be elastically deformable. For example, the bridge 123 may be provided to be elastically deformable.

The second plate 200 may be coupled to the rear of the first plate 100. The second plate 200 may be detachably coupled to the rear of the first plate 100.

For example, the second plate 200 may be covered by the first plate 100 and thus not exposed to the outside of the home appliance. For example, the second plate 200 may be provided to face the rear surface of the inner case 60. For example, the second plate 200 may be disposed to face the rear wall 65 of the inner case 60. For example, the second plate 200 may form the rear external appearance of the plate assembly 80a. The second plate 200 may be referred to as a rear plate 200.

The second plate 200 may include a second body 210. The second body 210 may form the external appearance of the second plate 200. The second body 210 may be referred to as a rear body 210.

The second plate 200 may include the second coupling portion 220 for coupling with the first plate 100. The second coupling portion 220 may be formed on a side of the second body 210 facing the first plate 100. The second coupling portion 220 of the second plate 200 may be provided to correspond to the first coupling portion 120 of the first plate 100. The second coupling portion 220 may be detachably coupled to the first coupling portion 120. The second coupling portion 220 may be provided to be locked with the first coupling portion 120.

The second coupling portion 220 may include the opening 221. The opening 221 may be formed in the second body 210 such that at least a portion of the first coupling portion 120 is inserted. The opening 221 may be provided to allow the protruding portion to be inserted thereinto. The opening 221 may be provided to allow the first coupling protrusion 121 to be inserted thereinto. The opening 221 may be provided to allow the second coupling protrusion 122 to be inserted thereinto.

The second coupling portion 220 may include the locking portion 222. The locking portion 222 may be provided to be coupled to the first coupling portion 120 inserted into the opening 221. The locking portion 222 may be provided to be locked with the first coupling portion 120 inserted into the opening 221. For example, the locking portion 222 may protrude radially inward of the opening 221. The first ridge 121a of the first coupling protrusion 121 may be provided to be locked with the locking portion 222. The second ridge 122a of the second coupling protrusion 122 may be provided to be locked with the locking portion 222.

The second coupling portion 220 may include a coupling body 223. The coupling body 223 may be provided to surround at least a portion of the first coupling portion 120. The coupling body 223 may be provided to accommodate at least a portion of the first coupling portion 120. For example, the coupling body 223 may be provided to surround an end of the first coupling protrusion 121, an end of the second coupling protrusion 122, and at least a portion of the bridge 123. For example, the coupling body 223 may extend along the direction in which the first plate 100 and the second plate 200 are arranged. For example, the coupling body 223 may have a substantially sidewall shape. For example, the coupling body 223 may be provided to form the opening 221. For example, the locking portion 222 may protrude toward the opening 221 from the coupling body 223.

As the first coupling portion 120 and the second coupling portion 220 are coupled to each other, the first plate 100 and the second plate 200 may be assembled with each other. The first plate 100 may include one or more first coupling portions 120, and the second plate 200 may include one or more second coupling portions 220. For example, the first coupling portions 120 may be provided corresponding in number to the number of the second coupling portions 220.

The second plate 200 may include a slit 230. The slit 230 may be formed in the second body 210. The slit 230 may be provided to pass through the second body 210. The slit 230 may be disposed adjacent to the second coupling portion 220. The slit 230 may be spaced apart from the opening 221. The slit 230 may be disposed radially outward of the opening 221.

The slit 230 may allow a force to act on the second plate 200 in a direction to be separated from the first plate 100 in a state in which the first plate 100 and the second plate 200 are coupled. The slit 230 may allow a force to act on the second body 210 in a direction away from the first body 110 in a state in which the first plate 100 and the second plate 200 are coupled to each other. Accordingly, the plate assembly 80a may be provided to have a repulsive force in a direction to separate the first plate 100 and the second plate 200 from each other in a state in which the first plate 100 and the second plate 200 are assembled with each other. As a result, the first plate 100 and the second plate 200 of the plate assembly 80a may be easily disassembled through a repulsive force. A worker may disassemble the first plate 100 and the second plate 200 without exerting a great force. Details thereof will be described below.

The second plate 200 may be provided to be elastically deformable. For example, as the second plate 200 includes the slit 230, at least a portion of the second body 210 may be provided to be elastically deformable. For example, a portion of the second body 210 adjacent to the slit 230 may be provided to be elastically deformable. For example, the second coupling portion 220 of the second plate 200 may be provided to be elastically deformable.

Meanwhile, the first plate 100 and the second plate 200 are not limited in the configuration by the ordinal numbers of "first" and "second". For example, the first plate 100 could be referred to as the second plate, while the second plate 200 could be referred to as the first plate.

The plate assembly 80a may further include the support member 300. The support member 300 may be provided between the first plate 100 and the second plate 200. The support member 300 may be provided to support at least one of the first plate 100 or the second plate 200. For example, the support member 300 may be provided to be in surface contact with at least one of the first plate 100 or the second plate 200. The support member 300 may be referred to as an intermediate member 300.

For example, the support member 300 may include at least one of an expanded polystyrene insulation, a urethane foam insulation, or a vacuum insulation panel. The support member 300 may include various heat insulations for improving the heat insulating performance of the cold air duct 80. In this case, the support member 300 may be referred to as a heat insulating member 300. However, it is not limited thereto, and depending on the characteristics of the home appliance to which the plate assembly 80*a* is applied, the support member 300 may include various materials.

The support member 300 may include a third body 310. The third body 310 may form the external appearance of the support member 300. A first surface 311 of the third body 310 may be provided to face the first body 110 of the first plate 100. The first surface 311 of the third body 310 may be provided to be in surface contact with the first body 110. A second surface 312 of the third body 310 is aside opposite to the first surface 311 and may be provided to face the second body 210 of the second plate 200. The second surface 312 of the third body 310 may be provided to be in surface contact with the second body 210.

The third body 310 may be referred to as a support body 310. The third body 310 may be referred to as an intermediate body 310.

The support member 300 may include a support hole 320. The support hole 310 may correspond to the opening 221 of the second coupling portion 220. The support hole 310 may be provided to accommodate the first coupling portion 120. The support hole 310 may be provided to surround the first coupling portion 120.

The support member 300 may include a seating portion 330 extending from the support hole 320. The seating portion 330 may be provided to support at least a portion of the second coupling portion 220. For example, the seating portion 330 may be provided to support the locking portion 222 of the second coupling portion 220. For example, the seating portion 330 may be provided to form a step with respect to the support hole 320. For example, the seating portion 330 may be provided to form a step with respect to the second surface 312 of the third body 310.

Figure 7:
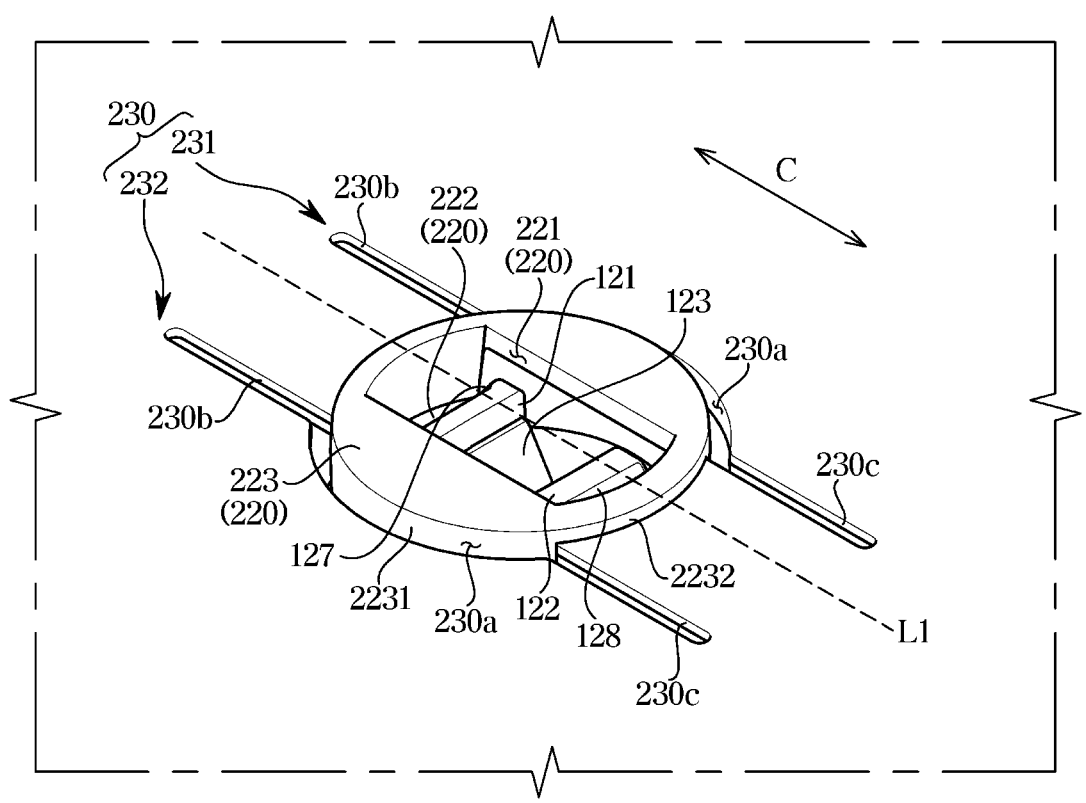
FIG. 7 is an enlarged view of a portion illustrating an example of a plate assembly according to an embodiment of the disclosure.
Figure 8:
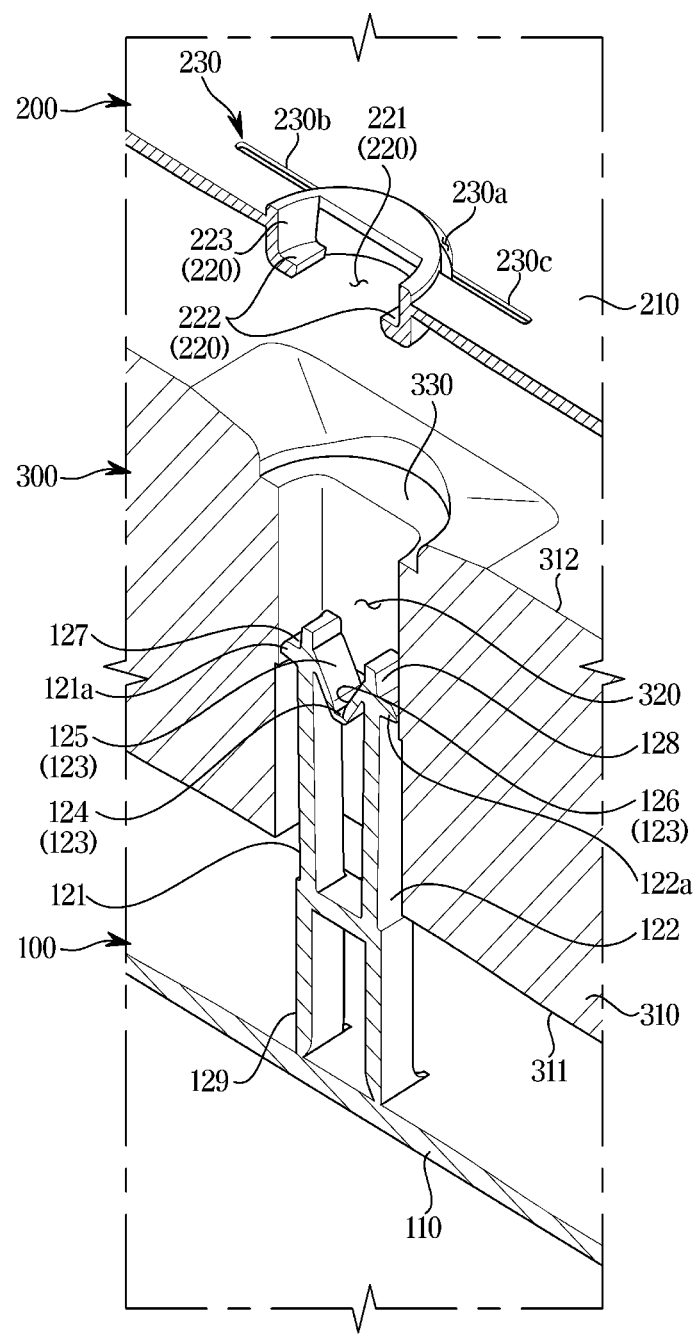
FIG. 8 is a cut-away perspective view illustrating a state before a plate assembly according to an embodiment of the disclosure is assembled.
Figure 9:
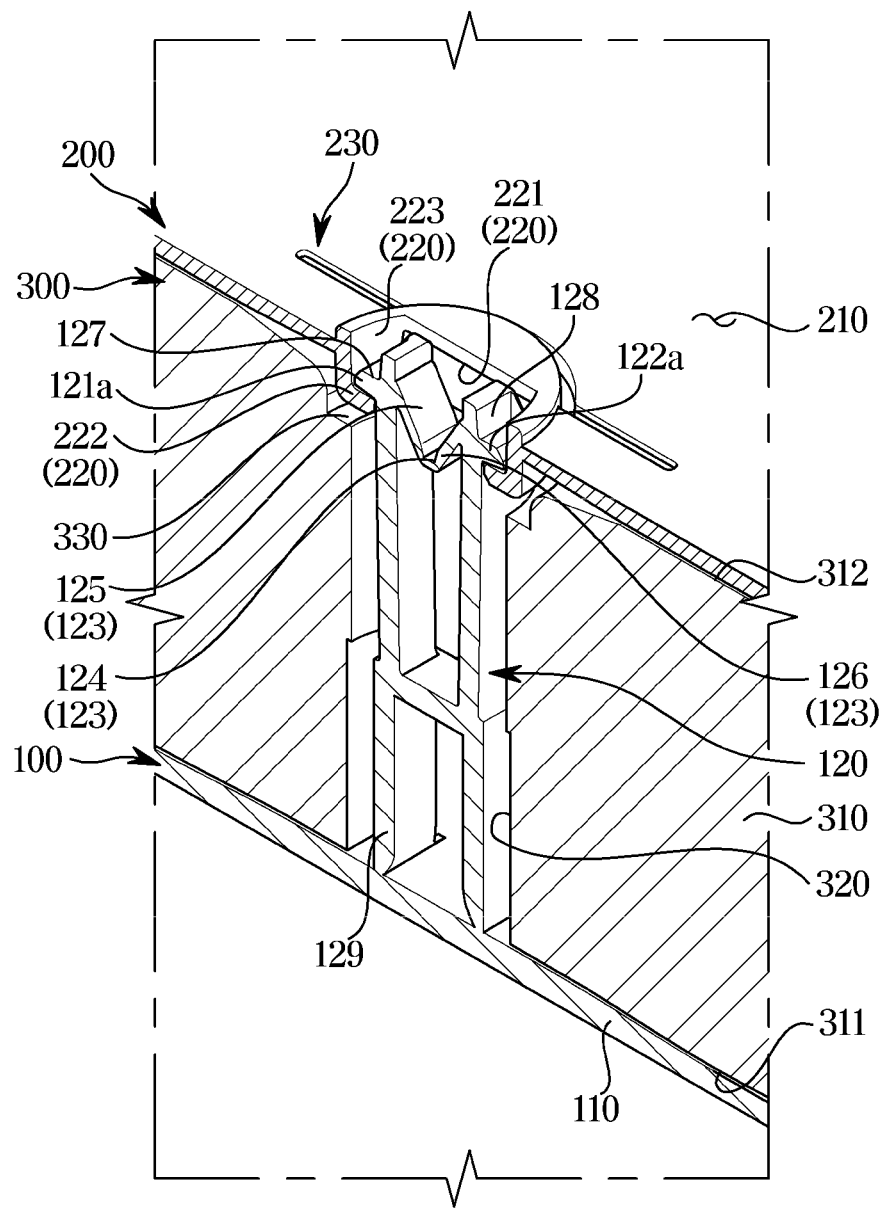
FIG. 9 is a cutaway perspective view illustrating a state in which the plate assembly shown in FIG. 8 is assembled.

FIG. 7 is an enlarged view of a portion illustrating an example of a plate assembly according to an embodiment. FIG. 8 is a cut-away perspective view illustrating a state before a plate assembly according to one embodiment is assembled. FIG. 9 is a cutaway perspective view illustrating a state in which the plate assembly shown in FIG. 8 is assembled.

Referring to FIG. 7, in a state in which the first plate 100 and the second plate 200 are coupled to each other, at least a portion of the first coupling portion 120 may be provided to be exposed through the opening 221. For example, the end of the first coupling protrusion 121 may be exposed through the opening 221. For example, the end of the second coupling protrusion 122 may be exposed through the opening 221.

In a state in which the first plate 100 and the second plate 200 are coupled to each other, at least a portion of the first coupling portion 120 may be provided to be accessible through the opening 221. For example, the first groove 127 may be provided to be accessible through the opening 221.

For example, the second groove 128 may be provided to be accessible through the opening 221. For example, a worker's hand or tool may be inserted into at least one of the first groove 127 or the second groove 128 through the opening 221.

The slit 230 of the second plate 200 may extend along a third direction C. The third direction C may be a direction in which the first coupling protrusion 121 and the second coupling protrusion 122 are arranged.

The slit 230 may include a first slit portion 231 and a second slit portion 232 spaced apart from the first slit portion 231. For example, in a state in which the first plate 100 and the second plate 200 are coupled to each other, the first coupling portion 120 is provided between the first slit portion 231 and the second slit portion 232.

For example, the first slit portion 231 and the second slit portion 232 may be provided to be symmetrical with respect to a first line L1. The first line L1 may pass through the center of the opening 221 while extending along the third direction C. For example, the first slit portion 231 and the second slit portion 232 may be provided as a pair.

For example, the slit 230 may include a first slit forming portion 230*a* extending along a portion of an edge of the coupling body 223. For example, the first slit forming portion 230*a* may have a shape corresponding to a portion of an edge of the coupling body 223. For example, the first slit forming portion 230*a* may have a curved shape. However, it is not limited thereto, and when the edge of the coupling body 223 is provided in a straight line, the first slit forming portion 230*a* may include a straight line shape.

For example, the slit 230 may include a second slit forming portion 230*b* extending from one side of the first slit forming portion 230*a* along the third direction C. For example, the second slit forming portion 230*b* may extend linearly along the third direction C. For example, the second slit forming portion 230*b* may have a straight line shape.

For example, the slit 230 may include a third slit forming portion 230*c* extending from the other side of the first slit forming portion 230*a* along the third direction C. For example, the third slit forming portion 230*c* may extend linearly along the third direction C. For example, the third slit forming portion 230*b* may have a straight line shape.

For example, each of the first slit portion 231 and the second slit portion 232 may include a first slit forming portion 230*a*, a second slit forming portion 230*b*, and a third slit forming portion 230*c*.

For example, the edge of the coupling body 223 of the second coupling portion 220 may include a first portion 2231 adjacent to the slit 230 and a second portion 2232 other than the first portion 2231. The first portion 2231 may be provided adjacent to the first slit forming portion 230*a*. The second portion 2232 may be provided to be connected to the second body 210.

Referring to FIG. 8, for coupling of the first plate 100 and the second plate 200, the first plate 100 and the second plate 200 may be aligned. The support member 300 may be provided between the first plate 100 and the second plate 200. However, it is not limited thereto, and the support member 300 may be omitted.

The first coupling portion 120 of the first plate 100 may protrude toward the second coupling portion 220 of the second plate 200. The first body 110 of the first plate 100 may be provided to face the first surface 311 of the third body 310 of the support member 300. The first coupling portion 120 of the first plate 100 may be inserted into the support hole 320 of the support member 300.

The second coupling portion 220 of the second plate 200 may correspond to the first coupling portion 120 of the first plate 100. The second coupling portion 220 of the second plate 200 may correspond to the support hole 320 and the seating portion 330 of the support member 300. The second body 210 of the second plate 200 may be provided to face the second surface 312 of the third body 310 of the support member 300.

Referring to FIG. 9, the first coupling portion 120 and the second coupling portion 220 may be coupled to each other. The first coupling portion 120 may be inserted into the support hole 320 and coupled to the second coupling portion 220. The first coupling portion 120 may be locked with the second coupling portion 220. As the first coupling portion 120 and the second coupling portion 220 are coupled to each other, the first plate 100 and the second plate 200 may be assembled with each other.

The first coupling protrusion 121 may be inserted into the opening 221 and coupled to the locking portion 222. The first coupling protrusion 121 may be inserted into the opening 221 and locked with the locking portion 222. The first ridge 121a of the first coupling protrusion 121 may be provided to be locked with the locking portion 222. The first coupling protrusion 121 may be restricted from moving in the first direction A and/or the second direction B while being locked with the locking portion 222.

The second coupling protrusion 122 may be inserted into the opening 221 and coupled to the locking portion 222. The second coupling protrusion 122 may be inserted into the opening 221 and locked with the locking portion 222. The second ridge 122a of the second coupling protrusion 122 may be provided to be locked with the locking portion 222. The second coupling protrusion 122 may be restricted from moving in the first direction A and/or the second direction B while being locked with the locking portion 222.

In general, for example, a screw fastening method may be used for assembly between parts. In this case, separate equipment (e.g., a screwdriver, etc.) may be required for screw fastening, and the work time may be relatively long. When the screw fastening is excessive, the exterior of the parts may be depressed. For example, when the thickness of the intermediate member is thick, the exterior of the parts may be damaged during screw fastening.

As another example, a hook method may be used for assembling parts. In this case, when one hook is assembled, another hook that has already been assembled may be disassembled. That is, inconvenience of having to reassemble the hook may be caused. In addition, when the hook fastening is excessive, the exterior of the parts may be depressed. For example, when the thickness of the intermediate member is thick, the exterior of the parts may be damaged during the hook assembly process.

According to the disclosure, the first plate 100 and the second plate 200 may be easily coupled to each other. The first coupling portion 120 and the second coupling portion 220 may be coupled to each other without a separate fastening member (e.g., a screw, a screwdriver, etc.). The first coupling portion 120 and the second coupling portion 220 may be provided to enable one-touch coupling. For example, the operator may assemble the first coupling portion 120 and the second coupling portion 220 by pressing one of the first coupling portion 120 and the second coupling portion 220 using a finger or an assembly jig. In addition, in a state in which the first coupling portion 120 and the second coupling portion 220 are locked with each other, the coupling of the first coupling portion 120 and the second coupling portion may be firmly maintained without a predetermined force applied to the first coupling portion 120 and the second coupling portion 220. As described above, the coupling of the first plate 100 and the second plate 200 may be facilitated, and the working time may be shortened. As a result, assemblability and productivity of the plate assembly 80a may be improved.

Also, the first plate 100 may be exposed to the outside of the home appliance, and the second plate 200 may be covered by the first plate 100 without being exposed to the outside. Since the second plate 200 includes the slit 230, the rigidity of the second plate 200 may be weaker than that of the first plate 100. For example, in a state in which the first plate 100 and the second plate 200 are coupled to each other, stress may be concentrated on an end of the slit 230 and/or a portion of the coupling body 223. For example, stress may be concentrated on the end of the second slit forming portion 230b, the end of the third slit forming portion 230c, and the second portion 2232 of the coupling body 223. That is, stress may not be concentrated on the first plate 100. Accordingly, when the first coupling portion 120 and the second coupling portion 220 are coupled to each other, only the second plate 200 having relatively weak rigidity may be deformed. As a result, an external appearance of the first plate 100 exposed to the outside of the home appliance may not be depressed. Aesthetics of the plate assembly 80a may not be degraded.

The support member 300 may be provided to be in surface contact with at least one of the first plate 100 or the second plate 200. As the first coupling portion 120 and the second coupling portion 220 are coupled to each other, the first plate 100 and the support member 300 may come into close contact with each other. As the first coupling portion 120 and the second coupling portion 220 are coupled to each other, the second plate 200 and the support member 300 may come into close contact with each other. For example, even when the thickness of the support member 300 is small, the second coupling portion 220 may be coupled to the first coupling portion 120 while being deformed. Accordingly, the airtightness of the plate assembly 80a may be improved. For example, when the plate assembly 80a is applied to the cold air duct 80, cold air flowing inside the cold air duct 80 may not flow outside, or wet air may not flow into the cold air duct 80.

Figure 10:
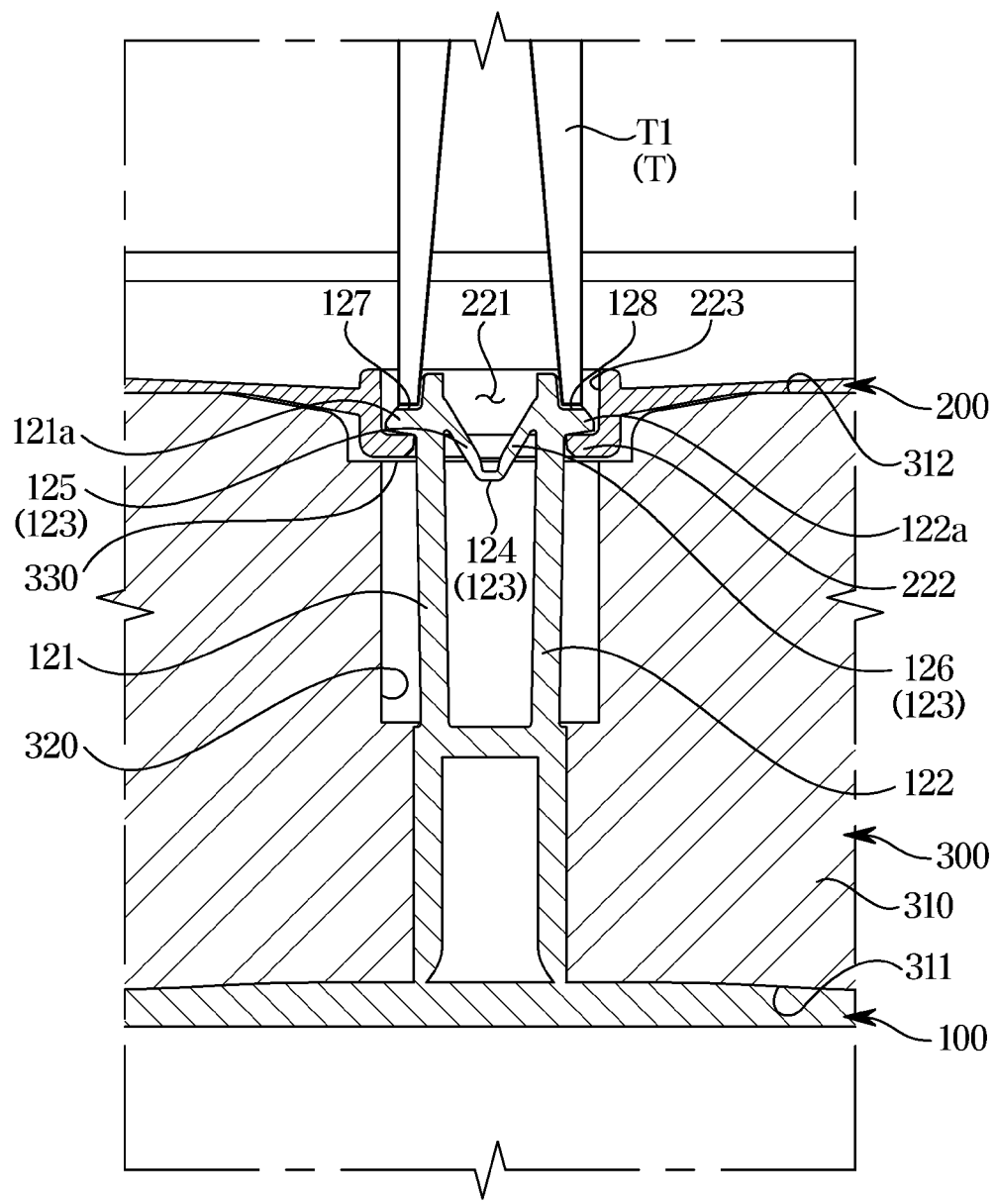
FIG. 10 is a cross-sectional view illustrating a state in which a first plate and a second plate of a plate assembly according to an embodiment of the disclosure are coupled.
Figure 11:
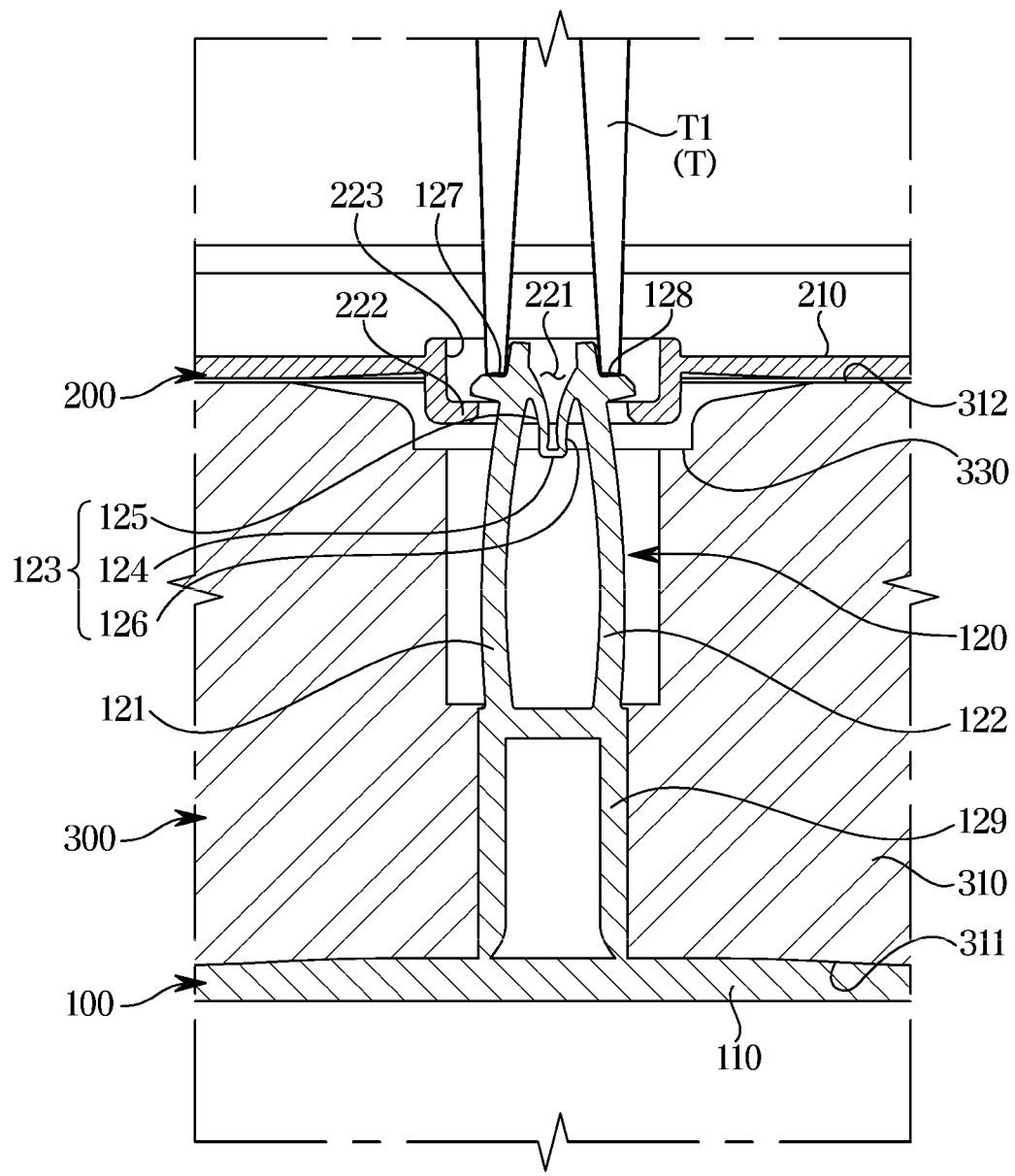
FIG. 11 is a cross-sectional view illustrating a state in which the first plate and the second plate of the plate assembly shown in FIG. 10 are being disassembled from each other.
Figure 12:
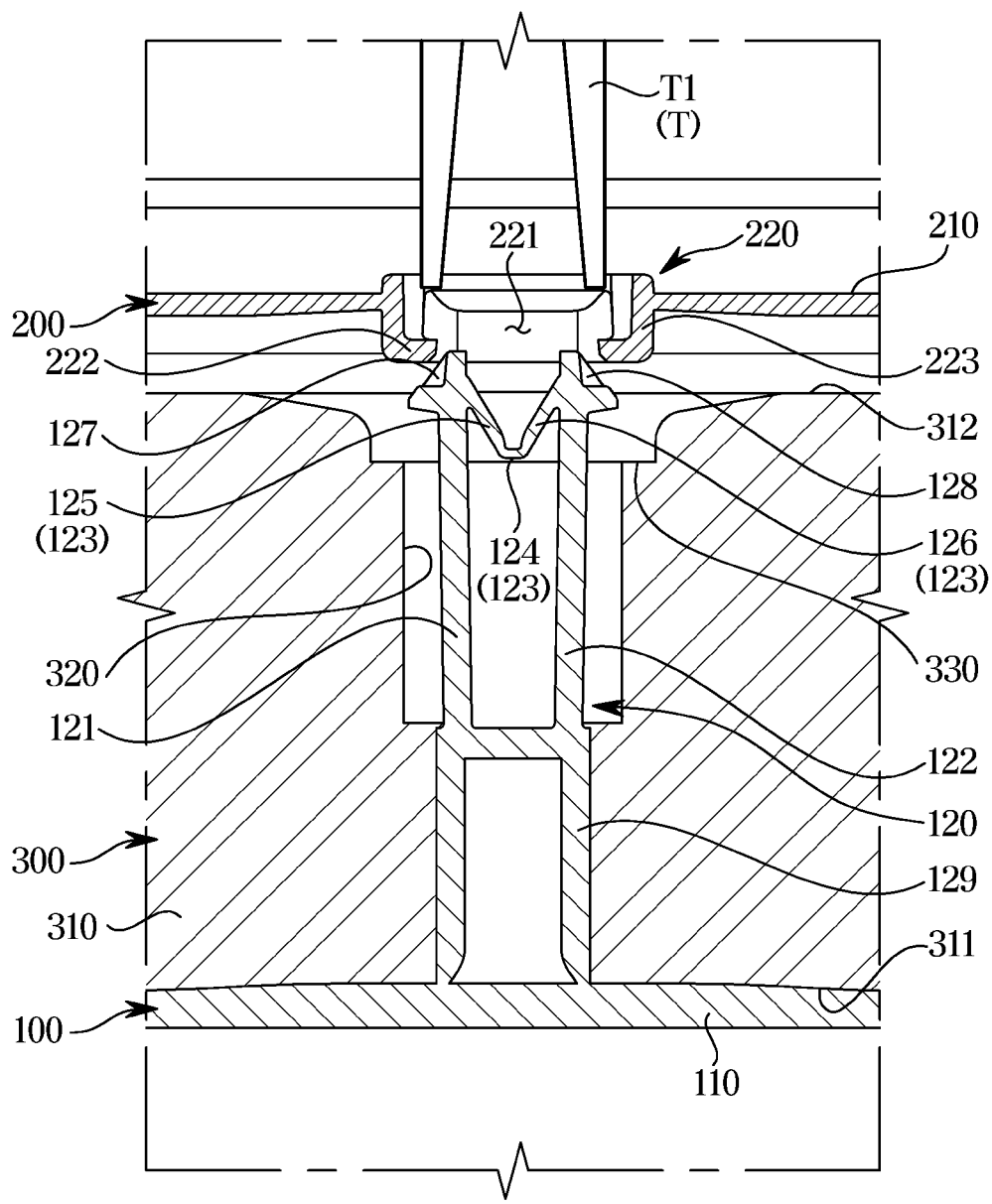
FIG. 12 is a cross-sectional view illustrating a state in which the first plate and the second plate of the plate assembly shown in FIG. 11 are disassembled from each other.

FIG. 10 is a cross-sectional view illustrating a state in which a first plate and a second plate of a plate assembly are coupled according to an embodiment. FIG. 11 is a cross-sectional view illustrating a state in which the first plate and the second plate of the plate assembly shown in FIG. 10 are being disassembled with each other. FIG. 12 is a cross-sectional view illustrating a state in which the first plate and the second plate of the plate assembly shown in FIG. 11 are disassembled with each other.

An example of a process of disassembling the plate assembly 80a is be described with reference to FIGS. 10 to 12.

Referring to FIG. 10, in a state in which the first coupling portion 120 and the second coupling portion 220 are coupled to each other, at least a portion of the first coupling portion 120 may be provided to be accessible through the opening 221 of the second coupling portion 220. For example, a tool T1 may be inserted into the groove 127 of the first coupling protrusion 121 through the opening 221. For example, the tool T1 may be inserted into the groove 128 of the second coupling protrusion 122 through the opening 221. For example, the tool T1 may have a substantially tong shape. For example, the tool T1 may be a long nose plier. Also, although not shown in the drawings, the operator may insert a finger into at least one of the grooves 127 or 128 instead of the tool T1.

Referring to FIG. 11, in a state in which the first plate 100 and the second plate 200 are coupled to each other, the first coupling protrusion 121 and the second coupling protrusion 122 may be pressed to be brought close together. The first coupling protrusion 121 and the second coupling protrusion 122 may be provided to be closed by the tool T1, a worker's finger, or the like. As the first coupling protrusion 121 and the second coupling protrusion 122 are brought close together, the bridge 123 may be elastically deformed. The first bridge portion 125 and the second bridge portion 126 may be brought close together. Accordingly, the coupling between the first coupling portion 120 and the second coupling portion 220 may be released. The first coupling portion 120 and the second coupling portion 220 may be separated from each other. Locking of the first coupling portion 120 and the second coupling portion 220 may be released. The coupling between the first coupling protrusion 121 and the locking portion 222 may be released. The coupling between the second coupling protrusion 122 and the locking portion 222 may be released.

Referring to FIG. 12, as the coupling between the first coupling portion 120 and the second coupling portion 220 is released, the first plate 100 and the second plate 200 may be disassembled from with each other. As the locking of the first coupling portion 120 and the second coupling portion 220 is released, the second plate 200 may be provided to move away from the first plate 100 by a repulsive force. In a state in which the first plate 100 and the second plate 200 are coupled to each other, the slit 230 may cause a force to act on the second plate 200 in a direction to be separated from the first plate 100. For example, as an external force presses on the first coupling portion 120 and the first coupling portion 120 and the second coupling portion 220 are decoupled, the second coupling portion 220 may be biased in a direction away from the first plate 100 by the slit 230. Accordingly, when the first coupling portion 120 and the second coupling portion 220 are separated from each other, the slit 230 may be provided to allow the second plate 200 to bounce against, or spring away from, the first plate 100. For example, in a state in which the first plate 100 and the second plate 200 are coupled to each other, when the first coupling portion 120 is deformed along the third direction C, the second portion (2232 in FIG. 7) of the coupling body 223 may be provided to bounce in the first direction A. As a result, disassembly of the first coupling portion 120 and the second coupling portion 220 may be facilitated. The first coupling portion 120 and the second coupling portion 220 may be provided to enable one-touch disassembly.

Figure 13:
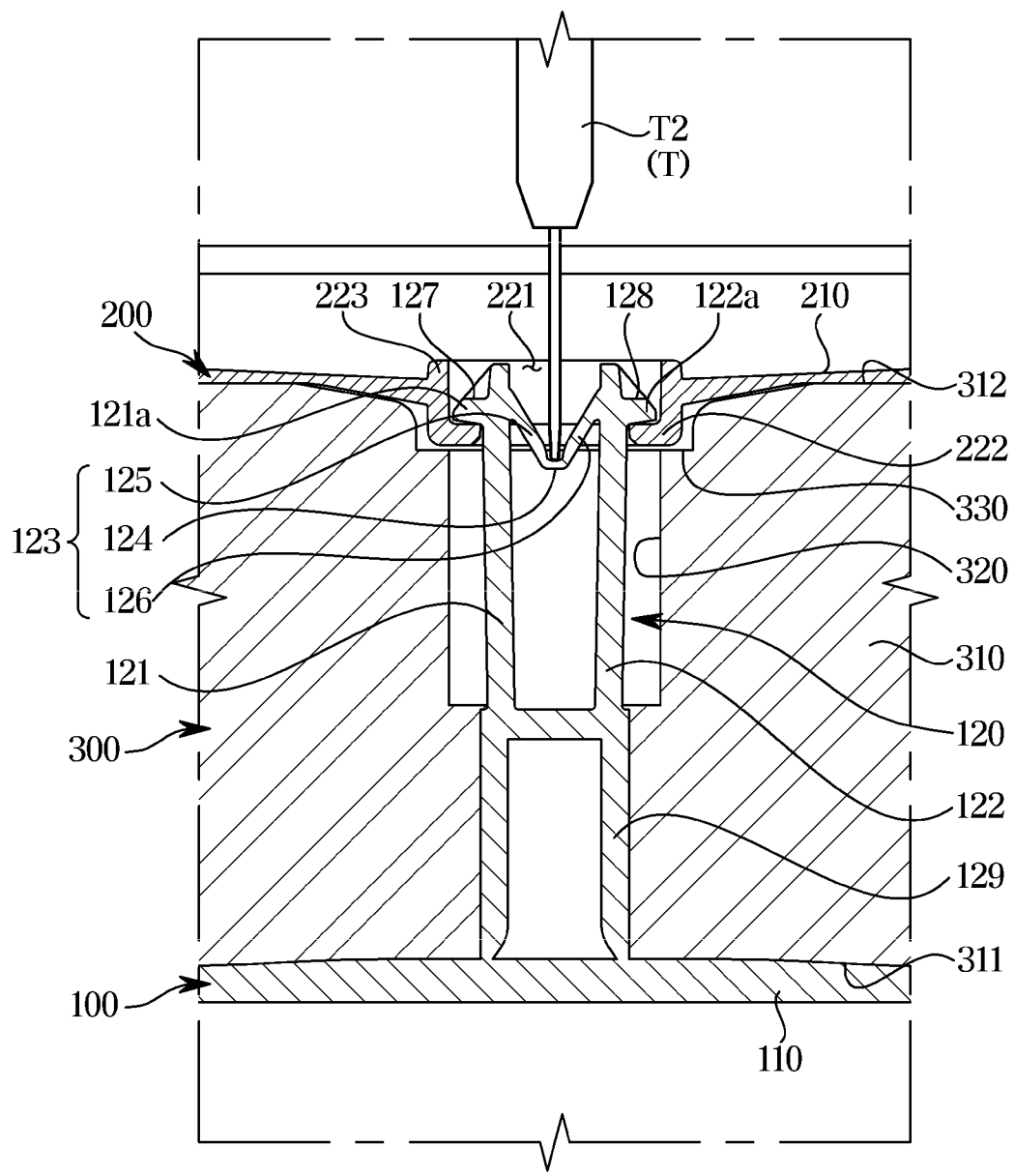
FIG. 13 is a cross-sectional view illustrating a state in which a first plate and a second plate of a plate assembly according to an embodiment of the disclosure are coupled.
Figure 14:
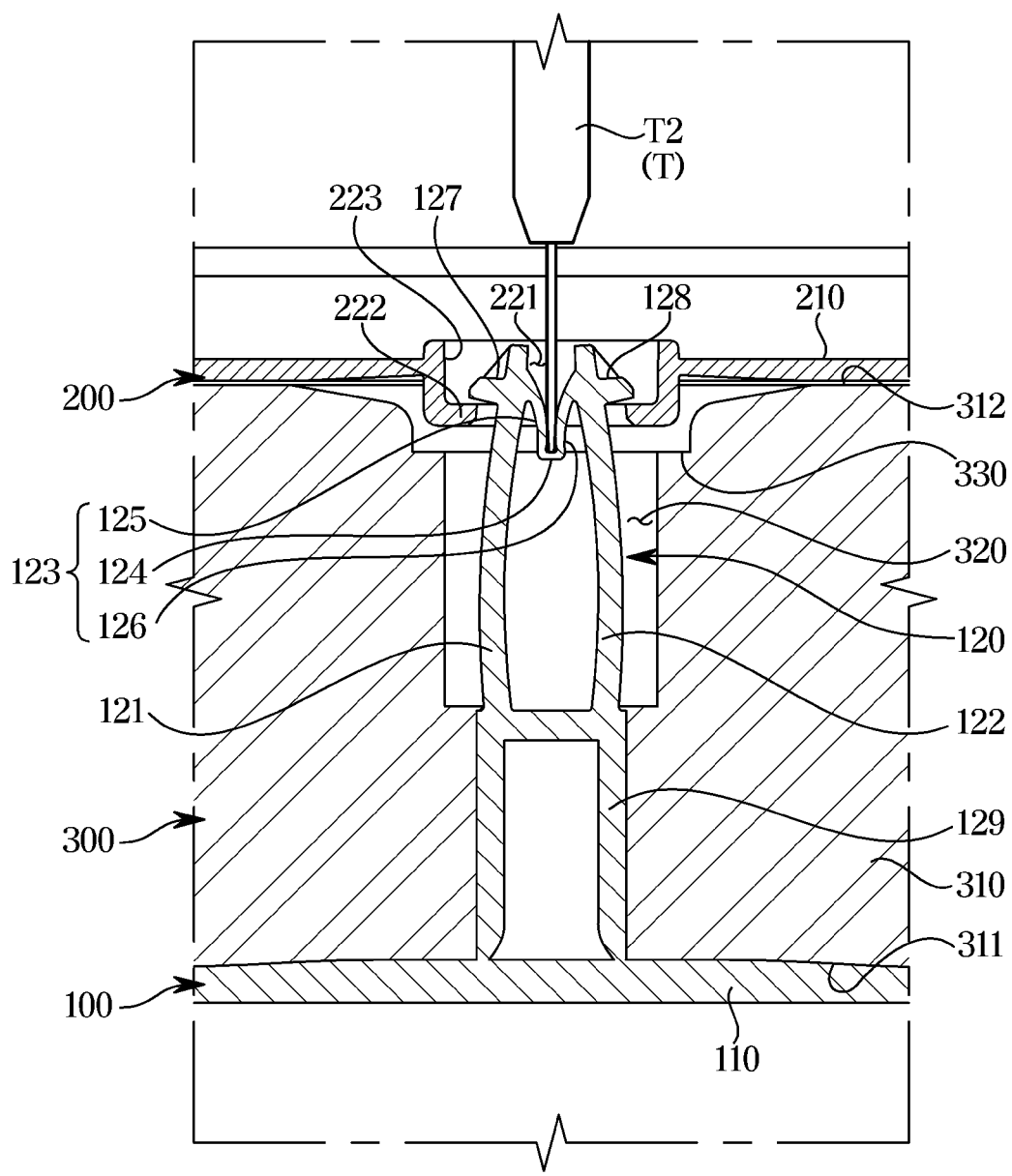
FIG. 14 is a cross-sectional view illustrating a state in which the first plate and the second plate of the plate assembly shown in FIG. 13 are being disassembled from each other.
Figure 15:
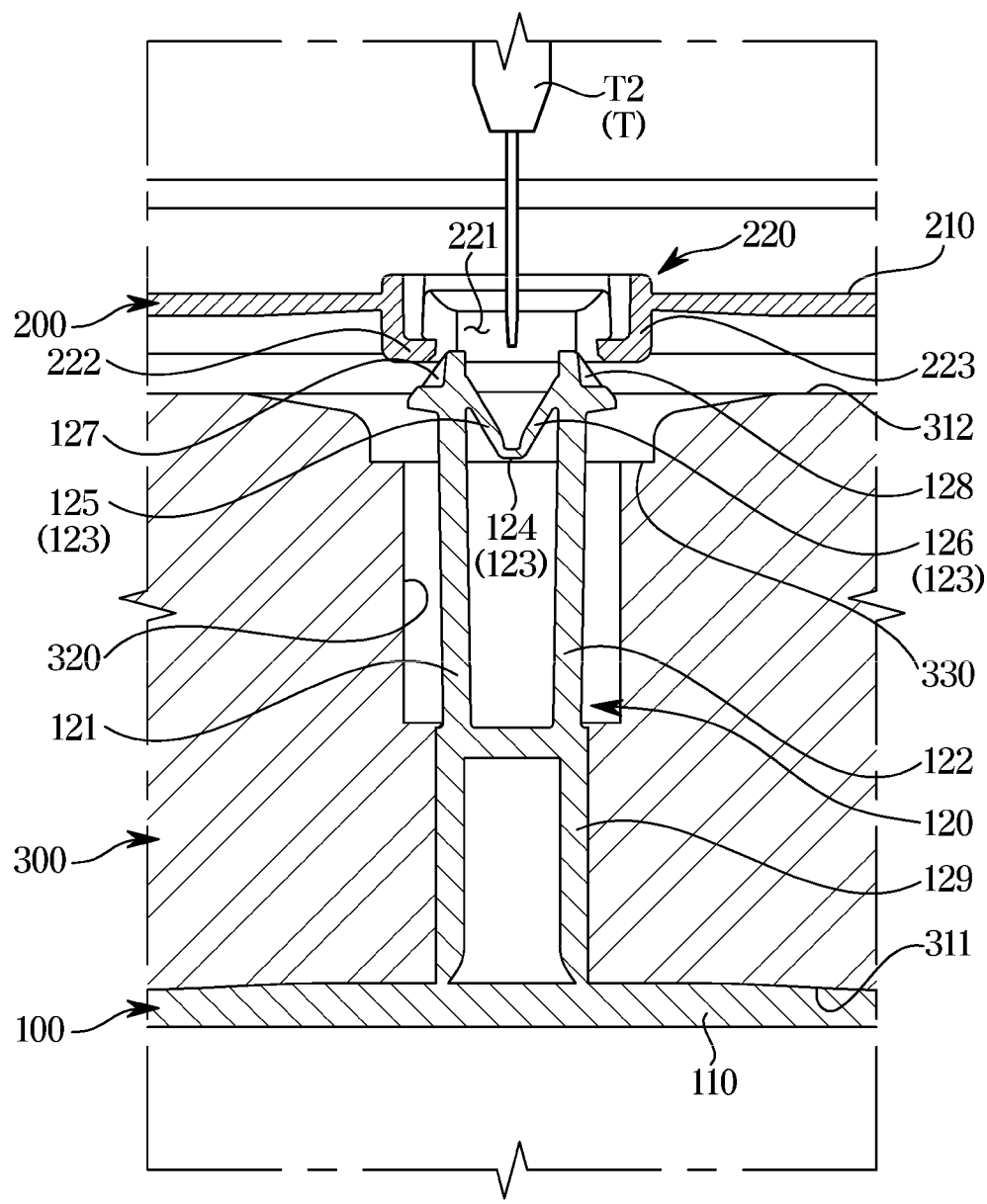
FIG. 15 is a cross-sectional view illustrating a state in which the first plate and the second plate of the plate assembly shown in FIG. 14 are disassembled from each other.

FIG. 13 is a cross-sectional view illustrating a state in which a first plate and a second plate of a plate assembly are coupled according to an embodiment. FIG. 14 is a cross-sectional view illustrating a state in which the first plate and the second plate of the plate assembly shown in FIG. 13 are being disassembled from with each other. FIG. 15 is a cross-sectional view illustrating a state in which the first plate and the second plate of the plate assembly shown in FIG. 14 are disassembled from with each other.

An example of a process of disassembling the plate assembly 80a is described with reference to FIGS. 13 to 15.

Referring to FIG. 13, in a state in which the first coupling portion 120 and the second coupling portion 220 are coupled to each other, at least a portion of the first coupling portion 120 may be provided to be accessible through the opening 221 of the second coupling portion 220. For example, a tool T2 may be inserted into the recessed portion 124 of the bridge 123 through the opening 221. For example, the tool T2 may have a shape extending in approximately one direction. For example, the tool T2 may be a slotted screwdriver. In addition, although not shown in the drawings, the operator may insert a finger into the recessed portion 124 of the bridge 123 instead of the tool T2.

Referring to FIG. 14, in a state in which the first plate 100 and the second plate 200 are coupled to each other, the bridge 123 may be pressed. In a state in which the first plate 100 and the second plate 200 are coupled to each other, the recessed portion 124 of the bridge 123 may be pressed in the second direction B. As the recessed portion 124 of the bridge 123 is pressed in the second direction B, the first coupling protrusion 121 and the second coupling protrusion 122 may be brought close together. As the recessed portion 124 of the bridge 123 is pressed in the second direction B, the first coupling protrusion 121 and the second coupling protrusion 122 may be provided to be closed. The first coupling protrusion 121 and the second coupling protrusion 122 may be elastically deformed. Accordingly, the coupling between the first coupling portion 120 and the second coupling portion 220 may be released. The first coupling portion 120 and the second coupling portion 220 may be separated from each other. Locking of the first coupling portion 120 and the second coupling portion 220 may be released. The coupling between the first coupling protrusion 121 and the locking portion 222 may be released. The coupling between the second coupling protrusion 122 and the locking portion 222 may be released.

Referring to FIG. 15, as the coupling between the first coupling portion 120 and the second coupling portion 220 is released, the first plate 100 and the second plate 200 may be disassembled from with each other. As the locking of the first coupling portion 120 and the second coupling portion 220 is released, the second plate 200 may be provided to move away from the first plate 100 by a repulsive force. In a state in which the first plate 100 and the second plate 200 are coupled to each other, the slit 230 may cause a force to act on the second plate 200 in a direction to be separated from the first plate 100. Accordingly, in response to the first coupling portion 120 and the second coupling portion 220 being separated from each other, the slit 230 may be provided to allow the second plate 200 to bounce against the first plate 100. For example, in a state in which the first plate 100 and the second plate 200 are coupled to each other, when the first coupling portion 120 is deformed along the second direction B, the second portion (2232 in FIG. 7) of the coupling body 223 may be provided to bounce in the first direction A. As a result, disassembly of the first coupling portion 120 and the second coupling portion 220 may be facilitated. The first coupling portion 120 and the second coupling portion 220 may be provided to enable one-touch disassembly.

Figure 16:
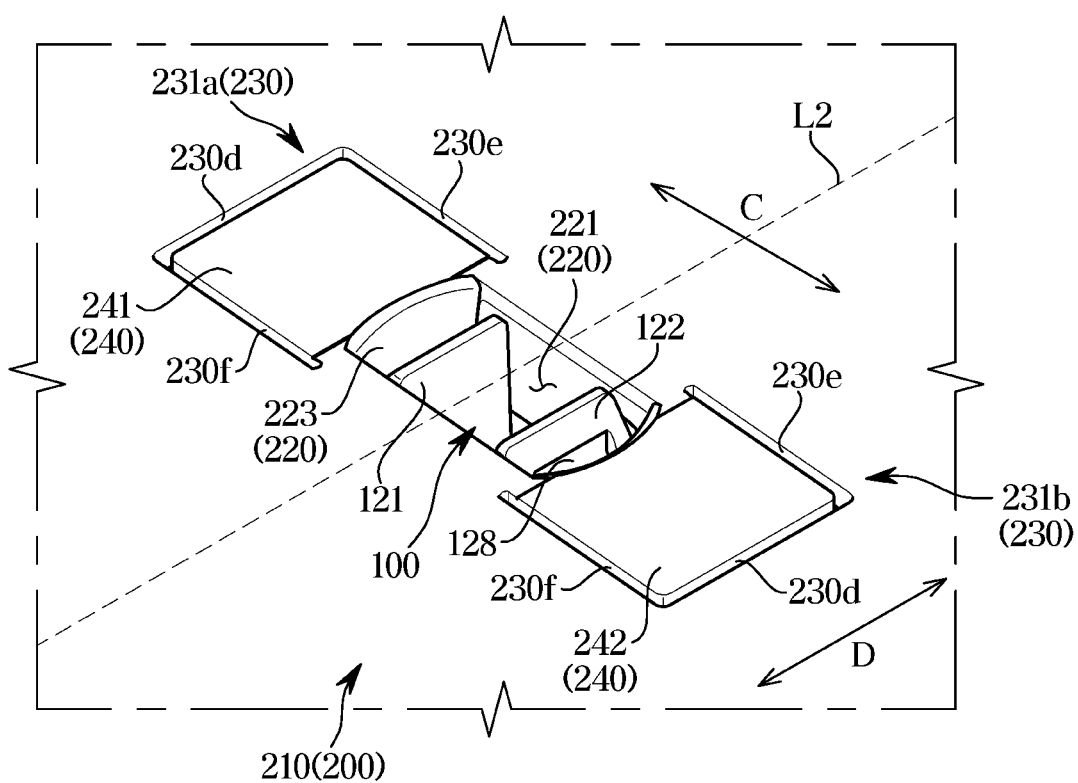
FIG. 16 is an enlarged view illustrating a portion of an example of a plate assembly according to an embodiment of the disclosure.
Figure 17:
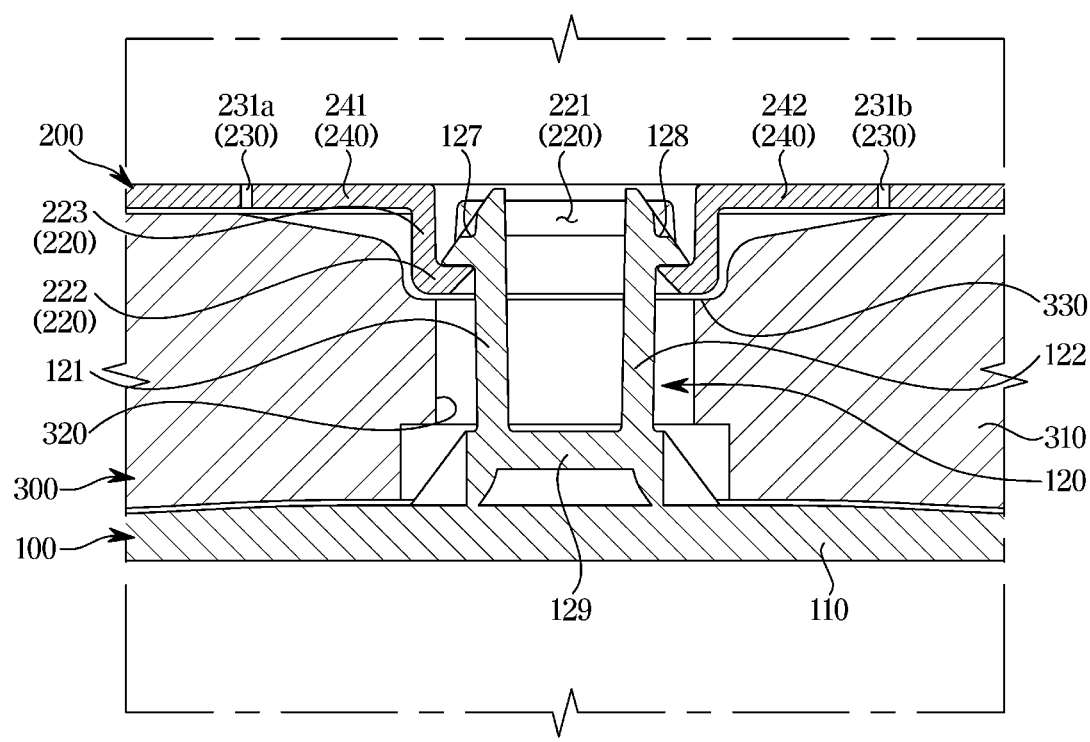
FIG. 17 is a cross-sectional view of the plate assembly shown in FIG. 16.
Figure 18:
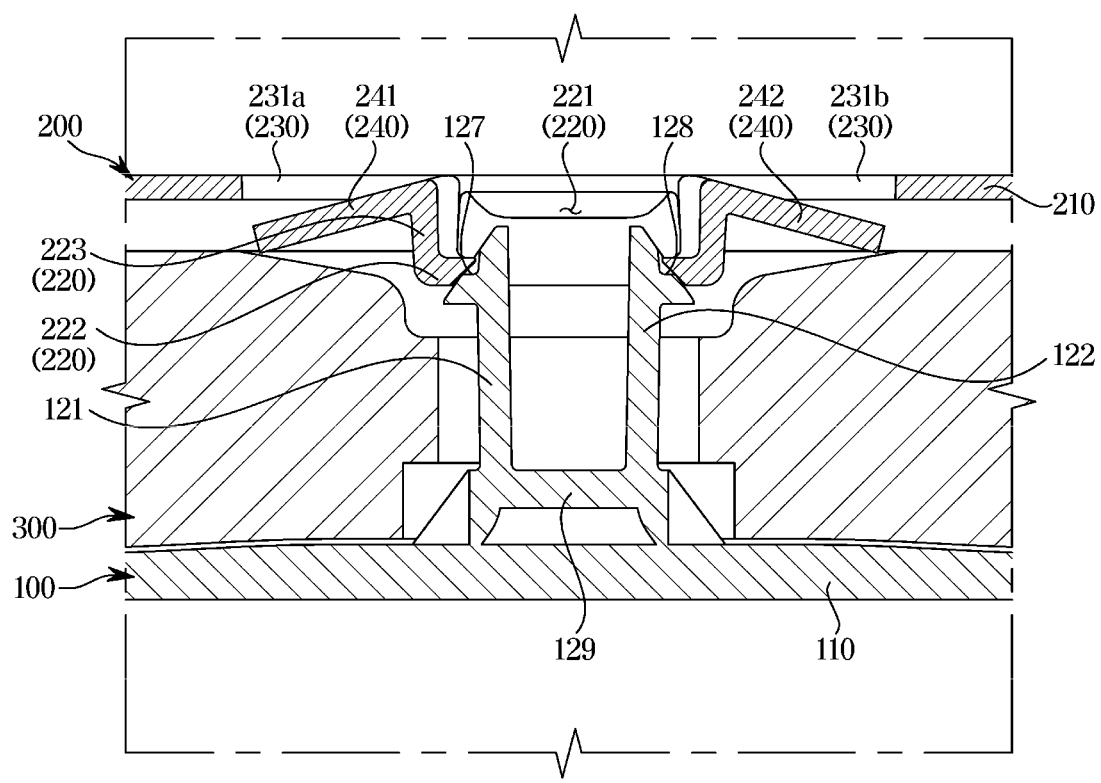
FIG. 18 is a cross-sectional view illustrating a state in which the first plate and the second plate of the plate assembly shown in FIG. 17 are being disassembled from each other.

FIG. 16 is an enlarged view illustrating a portion of an example of a plate assembly according to one embodiment. FIG. 17 is a cross-sectional view of the plate assembly shown in FIG. 16. FIG. 18 is a cross-sectional view illustrating a state in which the first plate and the second plate of the plate assembly shown in FIG. 17 are being disassembled from with each other.

An example of a process of disassembling the plate assembly is described with reference to FIGS. 16 to 18. The shape of the slit of the plate assembly shown in FIGS. 16 to 18 may be different from the shape of the slit of the plate assembly shown in FIGS. 5 to 15. Other configurations may be the same as those of the plate assembly described with reference to FIGS. 5 to 15. In describing the plate assembly shown in FIGS. 16 to 18, the same reference numerals are assigned to the same configurations as those of the plate assembly 80a described with reference to FIGS. 5 to 15, and detailed description thereof may be omitted.

Referring to FIG. 16, the slit 230 may include a first slit portion 231a and a second slit portion 231b spaced apart from the first slit portion 231a. For example, in a state in which the first plate 100 and the second plate 200 are coupled to each other, the first coupling portion 120 may be provided between the first slit portion 231a and the second slit portion 231b.

For example, the first slit portion 231a and the second slit portion 231b may be provided to be symmetrical with respect to a second line L2. The second line L2 may pass through the center of the opening 221 while extending along a fourth direction D crossing the third direction C. For example, the fourth direction D may be perpendicular to the third direction C. For example, the first slit portion 231a and the second slit portion 231b may be provided as a pair.

For example, the slit 230 may include a fourth slit forming portion 230d spaced apart from the opening 221 and extending along the fourth direction D. For example, the fourth slit forming portion 230d may be spaced apart from the opening 221 by a predetermined distance along the third direction C. For example, the fourth slit forming portion 230d may linearly extend along the fourth direction D. For example, the fourth slit forming portion 230d may have a straight line shape.

For example, the slit 230 may include a fifth slit forming portion 230e extending from one side of the fourth slit forming portion 230d toward the opening 221 along the third direction C. For example, the fifth slit forming portion 230e may extend linearly along the third direction C. For example, the fifth slit forming portion 230e may have a straight line shape.

For example, the slit 230 may include a sixth slit forming portion 230f extending from the other side of the fourth slit forming portion 230d toward the opening 221 along the third direction C. For example, the sixth slit forming portion 230f may extend linearly along the third direction C. For example, the sixth slit forming portion 230f may have a straight line shape.

For example, each of the first slit portion 231a and the second slit portion 231b may include a fourth slit forming portion 230d, a fifth slit forming portion 230e, and a sixth slit forming portion 230f.

The second plate 200 may include a wing portion 240. The slit 230 of the second plate 200 may form the wing portion 240. The slit 230 of the second plate 200 may be provided to define the wing portion 240. For example, the wing portion 240 may be a portion surrounded by the slit 230 and the coupling body 223. For example, the wing portion 240 may be provided to be elastically deformable.

For example, the second plate 200 may include a first wing portion 241 formed by the first slit portion 231a. For example, the first wing portion 241 may be formed by the fourth slit forming portion 230d, the fifth slit forming portion 230e, and the sixth slit forming portion 230f of the first slit portion 231a. The first wing portion 241 may have a cantilever shape.

For example, the second plate 200 may include a second wing portion 242 formed by the second slit portion 231b. For example, the second wing portion 242 may be formed by the fourth slit forming portion 230d, the fifth slit forming portion 230e, and the sixth slit forming portion 230f of the second slit portion 231b. The second wing 242 may have a cantilever shape.

For example, the first wing portion 241 and the second wing portion 242 may be provided to be symmetrical with respect to the second line L2.

Referring to FIG. 17, the first coupling portion 120 and the second coupling portion 220 may be coupled to each other. The first coupling portion 120 may be inserted into the support hole 320 and coupled to the second coupling portion 220. The first coupling portion 120 may be locked with the second coupling portion 220. The first coupling protrusion 121 may be inserted into the opening 221 and locked with the locking portion 222. The second coupling protrusion 122 may be inserted into the opening 221 and locked with the locking portion 222. In a state in which the first coupling portion 120 and the second coupling portion 220 are locked with each other, disassembly of the first plate 100 and the second plate 200 may be prevented.

Referring to FIG. 18, as the locking of the first coupling portion 120 and the second coupling portion 220 is released, the first plate 100 and the second plate 200 may be disassembled from with each other. As the locking of the first coupling portion 120 and the second coupling portion 220 is released, the second plate 200 may be provided to move away from the first plate 100 by a repulsive force. For example, as the first coupling protrusion 121 and the second coupling protrusion 122 are brought close together r, locking of the first coupling portion 120 and the second coupling portion 220 may be released.

In a state in which the first plate 100 and the second plate 200 are coupled to each other, the slit 230 may cause a force to act on the second plate 200 in a direction to be separated from the first plate 100. Accordingly, when the locking of the first coupling portion 120 and the second coupling portion 220 is released, the first plate 100 and the second plate 200 may be easily separated. As a result, disassembly of the first coupling portion 120 and the second coupling portion 220 may be facilitated. The first coupling portion 120 and the second coupling portion 220 may be provided to enable one-touch disassembly.

For example, when the locking of the first coupling portion 120 and the second coupling portion 220 is released, the wing portion 240 formed by the slit 230 may allow the second plate 200 to bounce from the first plate 100. When locking of the first coupling portion 120 and the second coupling portion 220 is released, the wing portion 240 may be provided to generate a repulsive force. For example, the wing portion 240 may function as a cantilever. For example, when locking of the first coupling portion 120 and the second coupling portion 220 is released, a free end of the wing portion 240 may move downward within a predetermined range.

Meanwhile, in FIGS. 16 to 18, the first coupling portion 120 of the first plate 100 is illustrated as not including the bridge 123, but it is not limited thereto. The structure of the bridge 123 shown in FIGS. 6 to 15 may also be applied to the first coupling portion 120 shown in FIGS. 16 to 18. That is, when the first coupling portion 120 shown in FIGS. 16 to 18 includes the bridge 123, the first plate 100 and the second plate 200 may be disassembled from with each other by pressing the recessed portion 124 of the bridge 123 in the second direction B. Since this has been described above, a detailed description thereof will be omitted.

Figure 19:
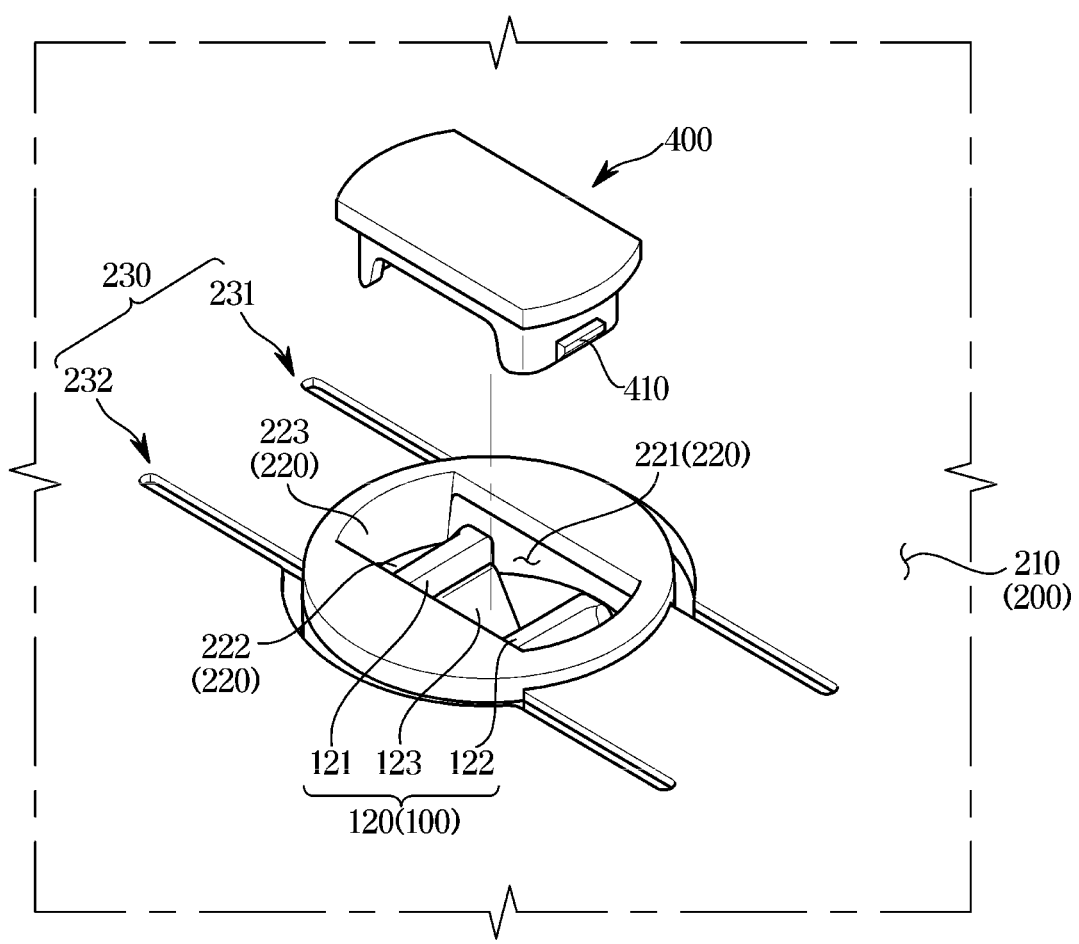
FIG. 19 is an enlarged view illustrating a portion of an example of a plate assembly according to an embodiment of the disclosure.

FIG. 19 is an enlarged view illustrating a portion of an example of a plate assembly according to an embodiment. The same reference numerals are assigned to the same configurations as those of the plate assembly described with reference to FIGS. 5 to 15, and detailed description thereof may be omitted.

Referring to FIG. 19, the plate assembly 80a may further include a cap 400. The cap 400 may be provided to correspond to the opening 221. The cap 400 may be detachably mounted on the opening 221. As the cap 400 is provided to cover the opening 221, moisture may be prevented from entering the opening 221. As the cap 400 is provided to cover the opening 221, introduction of wet air into the opening 221 may be prevented.

For example, the cap 400 may include a cap protrusion 410. When the cap 400 is mounted on the opening 221, the cap protrusion 410 may be provided to be locked with the second plate 200. Although not shown in the drawing, the second plate 200 may include a groove corresponding to the cap protrusion 410.

Figure 20:
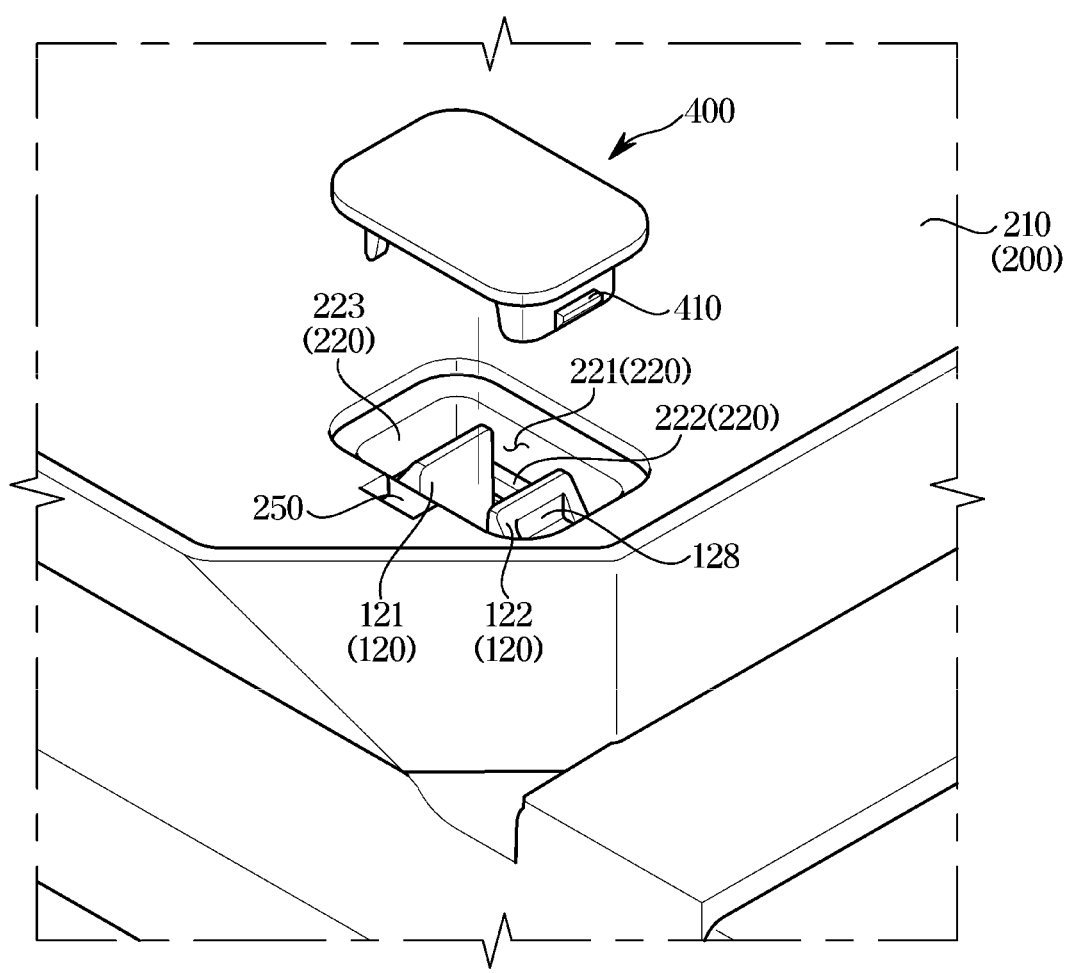
FIG. 20 is an enlarged view illustrating a portion of an example of a plate assembly according to an embodiment of the disclosure.
Figure 21:
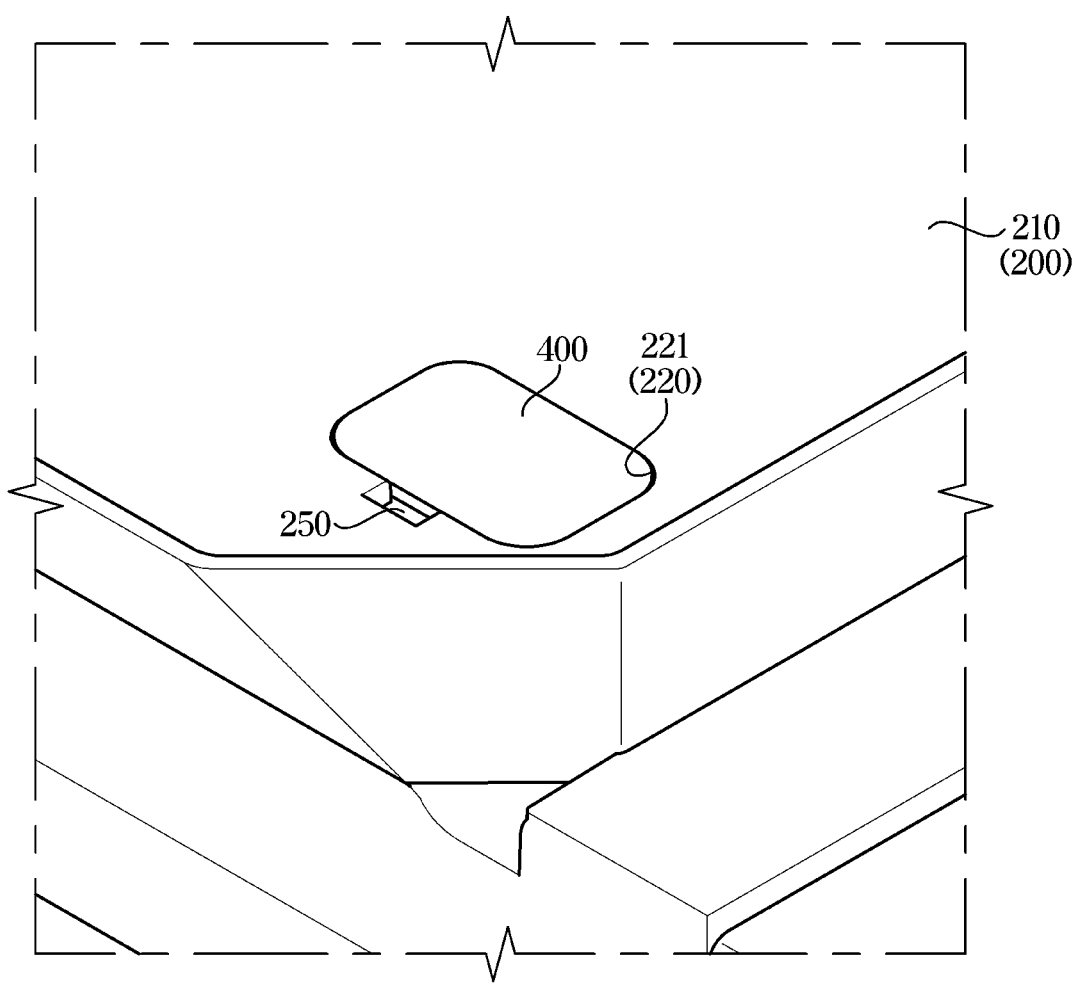
FIG. 21 is a view illustrating a state in which a cap shown in FIG. 20 is mounted on an opening according to an embodiment of the disclosure.

FIG. 20 is an enlarged view illustrating a portion of an example of a plate assembly according to an embodiment. FIG. 21 is a view illustrating a state in which a cap shown in FIG. 20 is mounted on an opening. The same reference numerals are assigned to the same configurations as those of the plate assembly described with reference to FIG. 19, and detailed description thereof may be omitted.

Referring to FIGS. 20 and 21, the plate assembly 80a may not include a slit 230. The plate assembly 80a may be provided not to include the slit 230 in a portion vulnerable to moisture. For example, when the first plate 100 includes a plurality of first coupling portions 120, and the second plate 200 includes a plurality of second coupling portions 220 corresponding to the plurality of first coupling portions 120, the slits 230 may be formed at a surrounding of at least some of the plurality of second coupling portions 220, and may not be formed at a surrounding of the rest of the plurality of second coupling portions 220.

The plate assembly 80a may include a cap 400 corresponding to the opening 221. The cap 400 may be detachably mounted on the opening 221. The cap 400 may be provided to cover the opening 221. The cap 400 may include a cap protrusion 410 provided to be locked with the second plate 200.

The plate assembly 80a may include a cutout portion 250. The cutout portion 250 may be formed as a part of the second body 210 that has been cut out. The cutout portion 250 may be disposed adjacent to the opening 221. For example, in a state in which the cap 400 is mounted on the opening 221, the operator's hand or tool T may be inserted into the cutout portion 250 to separate the cap 400 from the second plate 200.

Figure 22:
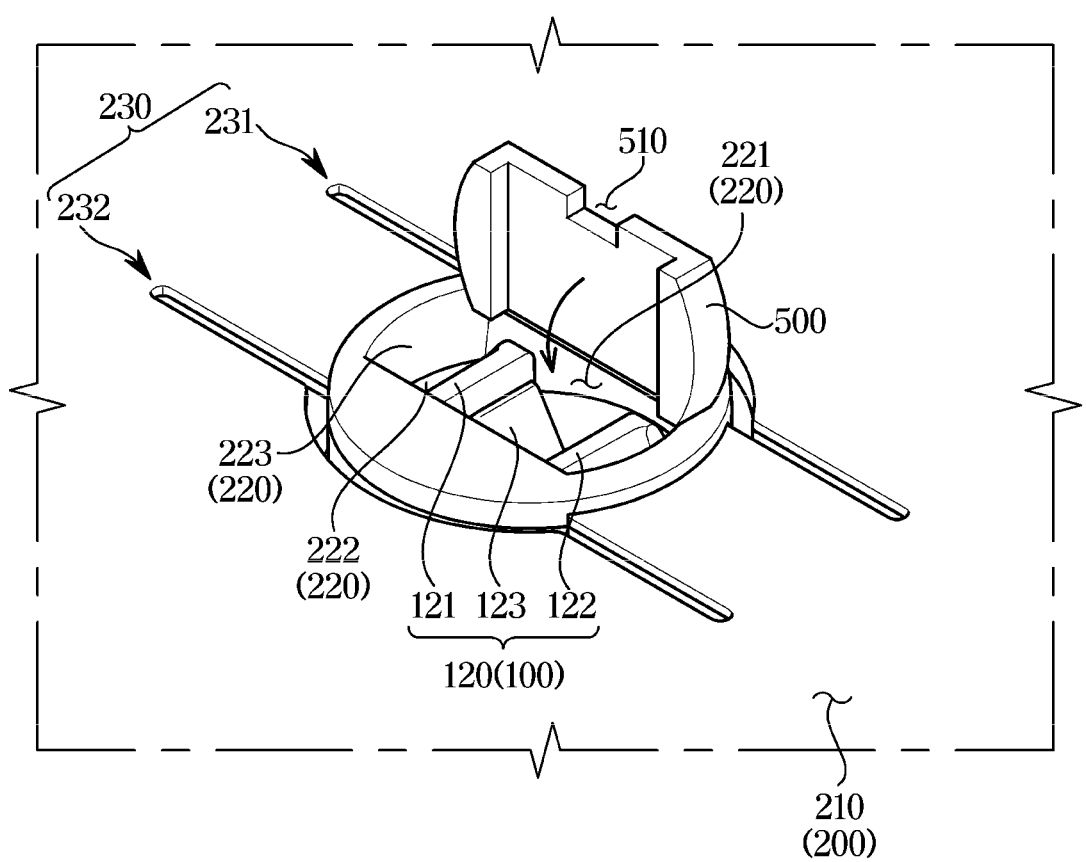
FIG. 22 is an enlarged view illustrating a portion of an example of a plate assembly according to an embodiment of the disclosure.

FIG. 22 is an enlarged view illustrating a portion of an example of a plate assembly according to one embodiment. The same reference numerals are assigned to the same configurations as those of the plate assembly described with reference to FIGS. 5 to 15, and detailed description thereof may be omitted.

Referring to FIG. 22, the plate assembly 80a may further include a cover 500. The second plate 200 may include the cover 500. The cover 500 may be provided to correspond to the opening 221. The cover 500 may be provided to open and close the opening 221. The cover 500 may be rotatably provided. As the cover 500 is provided to cover the opening 221, moisture may be prevented from entering the opening 221. As the cover 500 is provided to cover the opening 221, introduction of wet air into the opening 221 may be prevented.

The cover 500 may include a cutout portion 510. The cutout 510 may be formed as a part of the cover 500 that has been cut out. For example, in a state in which the cover 500 closes the opening 221, the operator's hand or tool T may be inserted into the cutout portion 510 to rotate the cover 500 so that the cover 500 may open the opening 221.

Figure 23:
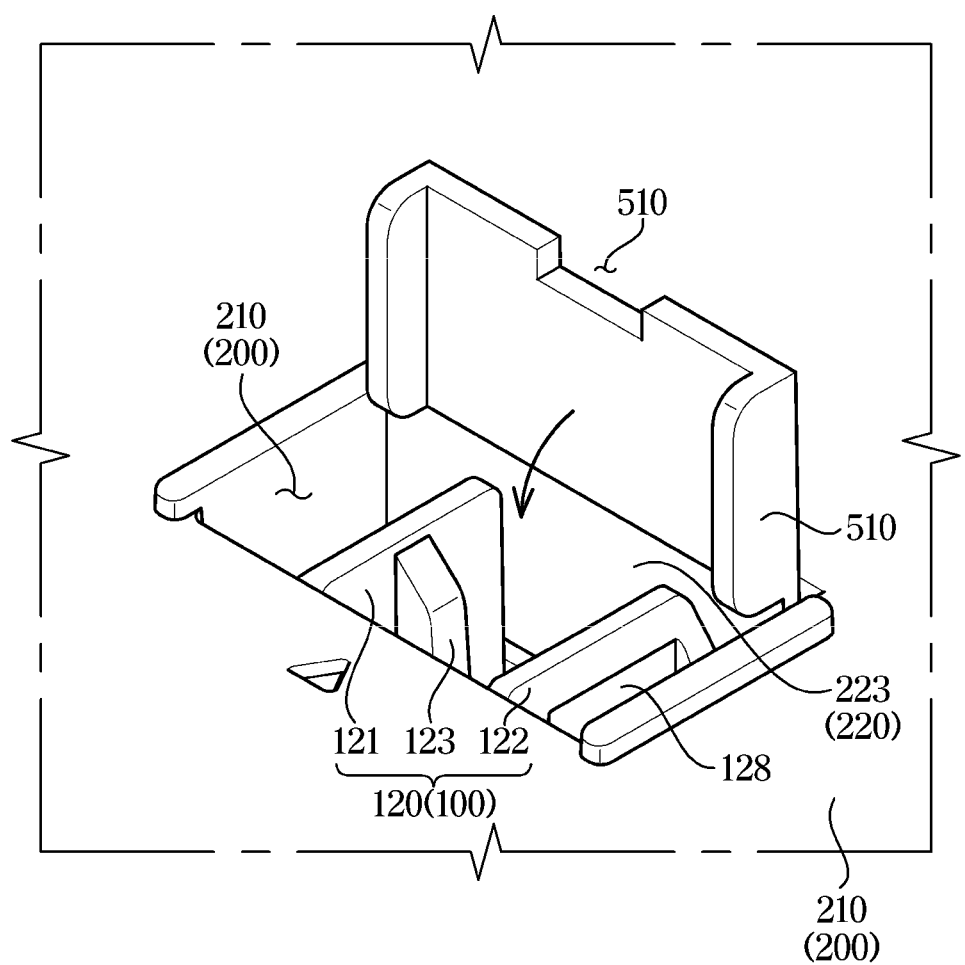
FIG. 23 is an enlarged view illustrating a portion of an example of a plate assembly according to an embodiment of the disclosure.
Figure 24:
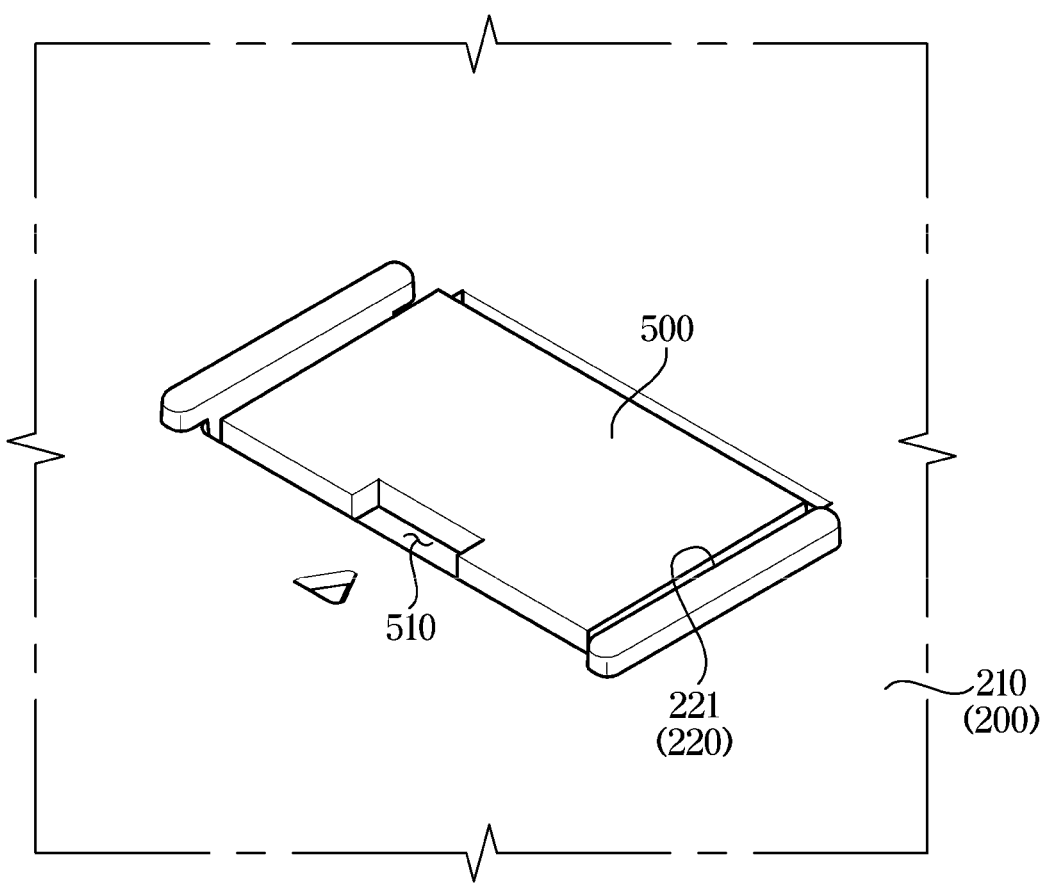
FIG. 24 is a view illustrating a state in which the cover shown in FIG. 23 covers the opening.

FIG. 23 is an enlarged view illustrating a portion of an example of a plate assembly according to an embodiment. FIG. 24 is a view illustrating a state in which the cover shown in FIG. 23 covers the opening. The same reference numerals are assigned to the same configurations as those of the plate assembly described with reference to FIG. 22, and detailed description thereof may be omitted.

Referring to FIGS. 23 and 24, the plate assembly 80a may not include the slit 230. The plate assembly 80a may be provided not to include the slit 230 in a portion vulnerable to moisture. For example, the first plate 100 includes a plurality of first coupling portions 120, and the second plate 200 includes a plurality of second coupling portions 220 corresponding to the plurality of first coupling portions 120, the slits 230 may be formed at a surrounding of at least some of the plurality of second coupling portions 220, and may not be formed at a surrounding of the rest of the plurality of second coupling portions 220.

The plate assembly 80a may include a cover 500 corresponding to the opening 221. The cover 500 may be provided to open and close the opening 221. The cover 500 may be provided to cover the opening 221.

The cover 500 may include a cutout portion 510. The cutout portion 510 may be formed as a part of the second body 210 that has been cut out. The cutout portion 510 may be disposed adjacent to the opening 221. For example, in a state in which the cover 500 covers the opening 221, an operator's hand or tool T may be inserted into the cutout portion 510 to rotate the cover 500 so that the cover 500 may open the opening 221.

Embodiments of the disclosure may provide a plate assembly including a first plate: and a second plate detachably coupled to the first plate. The first plate includes an opening: a coupling body extending along a direction in which the first plate and the second plate are arranged to form the opening: and a locking portion protruding from the coupling body toward the opening. The second plate may include a protruding portion formed to be inserted into the opening and coupled to the locking portion, the protruding portion including a first coupling protrusion extending in a first direction toward the first plate and a second coupling portion spaced apart from the first coupling protrusion and extending in the first direction: and a bridge connecting the first coupling protrusion and the second coupling protrusion, the bridge forming a recessed portion that is recessed in a second direction opposite to the first direction.

The first plate may further include a slit spaced apart from the opening. The slit may be formed such that a force acts on the first plate in a direction to be separated from the second plate in a state in which the first plate and the second plate are coupled to each other.

As the first coupling protrusion and the second coupling protrusion are pressed to come closer, the locking portion and the protruding portion may be separated from each other.

As the recessed portion is pressed in the second direction, the locking portion and the protruding portion may be separated from each other.

The protruding portion and the bridge may be provided to be elastically deformable.

According to an aspect of the disclosure, the plate assembly and the home appliance may allow for easy coupling and/or disassembling between parts.

According to an aspect of the disclosure, the plate assembly and the home appliance may be improved in assemblability.

According to an aspect of the disclosure, the plate assembly and the home appliance may prevent moisture from entering a coupling region between parts.

According to an aspect of the disclosure, the plate assembly and the home appliance may be improved in aesthetics.

According to an aspect of the disclosure, the plate assembly and the home appliance may be improved in sealing property.

Aspects of embodiments of the disclosure are not limited to those described above, and other aspects that are not described will be clearly understood by those skilled in the art from the description.

Specific embodiments illustrated in the drawings have been described above. However, the disclosure is not limited to the embodiments described above, and those of ordinary skill in the art to which the disclosure pertains may make various changes thereto without departing from the gist of the technical spirit of the disclosure defined in the claims below.

What is claimed is:

1. A refrigerator comprising:
   a storage compartment;
   an evaporator configured to generate cold air; and
   a cold air duct configured to guide the cold air generated in the evaporator to the storage compartment, the cold air duct including:
      a front plate facing the storage compartment, the front plate including:
         a front body, and
         a first coupling portion on a rear surface of the front body,
      a rear plate detachably coupled to a rear of the front plate, the rear plate including:
         a rear body,
         a second coupling portion including:
            an opening in the rear body, and
            a locking portion, and
            a slit in the rear body configured so that the second coupling portion is elastically deformable, and
      a heat insulating member disposed between the front plate and the rear plate,
   wherein
      the first coupling portion is coupled to the second coupling portion as a portion of the first coupling portion is inserted into the opening in the rear body, and the locking portion protrudes toward and contacts the portion of the first coupling portion inserted into the opening in the rear body, and
      the first coupling portion and the second coupling portion are configured so that the first coupling portion and the second coupling portion are decouplable by an external force pressing on the first coupling portion.

2. The refrigerator of claim 1, wherein
   the first coupling portion includes:
      a first coupling protrusion extending in a first direction directed toward the rear plate,
      a second coupling protrusion spaced apart from the first coupling protrusion and extending in the first direction, and
      a bridge connecting the first coupling protrusion and the second coupling protrusion, the bridge including a recessed portion recessed in a second direction opposite to the first direction.

3. The refrigerator of claim 2, wherein
   in response to the external force pressing on the recessed portion of the bridge in the second direction in a state in which the front plate and the rear plate are coupled to each other, the first coupling protrusion and the second coupling protrusion are moved toward one another so that the first coupling portion and the second coupling portion are decoupled.

4. The refrigerator of claim 2, wherein
   in response to the external force pressing the first coupling protrusion and the second coupling protrusion to be moved toward one another in a state in which the front plate and the rear plate are coupled to each other, the bridge is elastically deformed and the first coupling portion and the second coupling portion are decoupled.

5. The refrigerator of claim 1, further comprising:
   a cap corresponding to the opening and detachably mounted on the opening to prevent moisture from entering the opening.

6. The refrigerator of claim 1, wherein
   the rear plate includes a cover configured to open and close the opening to prevent moisture from entering the opening.

7. The refrigerator of claim 2, wherein
   the slit extends along a direction in which the first coupling protrusion and the second coupling protrusion are arranged.

8. The refrigerator of claim 2, wherein
   the slit includes:
      a first slit portion, and
      a second slit portion spaced apart from the first slit portion, and
   the first coupling portion is disposed between the first slit portion and the second slit portion in a state in which the front plate and the rear plate are coupled to each other.

9. The refrigerator of claim 2, wherein
   the second coupling portion includes:
      a coupling body configured to surround the portion of the first coupling portion inserted into the opening in the rear body, and
   the slit includes:
      a first slit forming portion along a portion of an edge of the coupling body,
      a second slit forming portion extending in a straight line from a first side of the first slit forming portion, and
      a third slit forming portion extending in a straight line from a second side of the first slit forming portion.

10. The refrigerator of claim 2, wherein
    the slit includes:
       a first slit forming portion spaced apart from the opening and extending in a direction perpendicular to a direction in which the first coupling protrusion and the second coupling protrusion are arranged,
       a second slit forming portion extending from a first side of the first slit forming portion toward the opening along the direction in which the first coupling protrusion and the second coupling protrusion are arranged, and
       a third slit forming portion extending from a second side of the first slit forming portion toward the opening along the direction in which the first coupling protrusion and the second coupling protrusion are arranged.

11. The refrigerator of claim 2, wherein
the first coupling portion includes:
- a first groove on the first coupling protrusion, and accessible through the opening from behind the rear body, and
- a second groove on the second coupling protrusion, and accessible through the opening from behind the rear body.

12. The refrigerator of claim 2, wherein
the bridge includes:
- a first bridge portion extending from the first coupling protrusion to the recessed portion, and sloping toward the front body, and
- a second bridge portion extending from the second coupling protrusion to the recessed portion, and sloping toward the front body.

13. The refrigerator of claim 12, wherein
the recessed portion is provided at a center of the bridge.

14. The refrigerator of claim 1, wherein
the heat insulating member is configured to be in surface contact with at least one of the front plate and the rear plate.

15. The refrigerator of claim 1, wherein
the heat insulating member includes:
- a support hole corresponding to the opening of the second coupling portion and configured to accommodate the first coupling portion, and
- a seating portion extending inwardly from a rear surface of the heat insulating member about the support hole, and configured to support the locking portion of the second coupling portion.

* * * * *